United States Patent [19]
Terada et al.

[11] Patent Number: 5,999,586
[45] Date of Patent: Dec. 7, 1999

[54] TIME COUNTING CIRCUIT AND PULSE SIGNAL GENERATING METHOD

[75] Inventors: Yutaka Terada, Osaka; Keiichi Kusumoto, Hyogo; Akira Matsuzawa, Kyoto, all of Japan

[73] Assignee: Matsushita Electric Industrial Co., Ltd., Osaka, Japan

[21] Appl. No.: 08/795,907

[22] Filed: Mar. 4, 1997

[30] Foreign Application Priority Data

Mar. 8, 1996 [JP] Japan ..................................... 8-051162

[51] Int. Cl.$^6$ ...................................................... G01D 3/00
[52] U.S. Cl. ............................ 377/20; 327/161; 327/295
[58] Field of Search ....................... 377/20, 19; 327/161, 327/295

[56] References Cited

U.S. PATENT DOCUMENTS

| 5,812,626 | 9/1998 | Kusumoto et al. | 377/20 |
| 5,828,717 | 10/1998 | Kusumoto et al. | 377/20 |
| 5,835,552 | 11/1998 | Kusumoto et al. | 377/20 |

OTHER PUBLICATIONS

Takamoto Wtanabe et al. "A Time–to–Digital Converter LSI" The Institute Of Electronics Information And Communication Engineers, Technical Report Of IEICE, Aug., 1993, pp. 37–43.

*Primary Examiner*—Margaret R. Wambach
*Attorney, Agent, or Firm*—McDermott, Will & Emery

[57] ABSTRACT

There is provided a small-size time counting circuit which measures time with high accuracy and low power consumption. Around a differential inverter ring composed of an odd number of differential inverters of identical structure connected in a ring configuration, signal transition is caused to circulate by oscillation. A first signal group is composed of normal output signals from the odd-numbered differential inverters and inverted output signals from the even-numbered differential inverters, which rise and fall sequentially at equal time intervals corresponding to delay times in the individual differential inverters. A second signal group is composed of inverted output signals from the odd-numbered differential inverters and normal output signals from the even-numbered differential inverters, which similarly rise and fall sequentially at equal time intervals. Accordingly, even when the rise time of an output signal from each of the differential inverters composing the differential inverter ring is different from the fall time thereof, the use of the first and second signal groups provides equal increments of time for time measurement.

17 Claims, 19 Drawing Sheets

Fig. 6

| TRANSISTOR | GATE WIDTH ($\mu$m) | GATE LENGTH ($\mu$m) |
|---|---|---|
| MP1 | 50 | 0.6 |
| MP2 | 20 | 0.6 |
| MP3 | 20 | 0.6 |
| MN1 | 20 | 1.0 |
| MN2 | 20 | 1.0 |
| MN3 | 20 | 1.0 |
| MN4 | 20 | 1.0 |

Fig. 10

| TIME | OUTPUT SIGNALS FROM FIRST ROW OF HOLDING CIRCUITS 12 <br> $(1\ \overline{2}\ 3\ \overline{4}\ 5 \cdots 31\ \overline{32}\ 33)$ | OUTPUT SIGNALS FROM SECOND ROW OF HOLDING CIRCUITS 13 <br> $(\overline{1}\ 2\ \overline{3}\ 4\ \overline{5} \cdots \overline{31}\ 32\ \overline{33})$ | POSITION OF SIGNAL TRANSITION |
|---|---|---|---|
| 1 | 0 0 0 0 0 ... 0 0 0 | 1 1 1 1 1 ... 1 1 1 | 1 |
| 2 | 1 0 0 0 0 ... 0 0 0 | 0 1 1 1 1 ... 1 1 1 | $\overline{2}$ |
| 3 | 1 1 0 0 0 ... 0 0 0 | 0 0 1 1 1 ... 1 1 1 | 3 |
| 4 | 1 1 1 0 0 ... 0 0 0 | 0 0 0 1 1 ... 1 1 1 | $\overline{4}$ |
| 5 | 1 1 1 1 0 ... 0 0 0 | 0 0 0 0 1 ... 1 1 1 | 5 |
| ⋮ | ⋮ | ⋮ | ⋮ |
| 31 | 1 1 1 1 1 ... 0 0 0 | 0 0 0 0 0 ... 1 1 1 | 31 |
| 32 | 1 1 1 1 1 ... 1 0 0 | 0 0 0 0 0 ... 0 1 1 | $\overline{32}$ |
| 33 | 1 1 1 1 1 ... 1 1 0 | 0 0 0 0 0 ... 0 0 1 | 33 |
| 34 | 1 1 1 1 1 ... 1 1 1 | 0 0 0 0 0 ... 0 0 0 | $\overline{1}$ |
| 35 | 0 1 1 1 1 ... 1 1 1 | 1 0 0 0 0 ... 0 0 0 | 2 |
| 36 | 0 0 1 1 1 ... 1 1 1 | 1 1 0 0 0 ... 0 0 0 | $\overline{3}$ |
| 37 | 0 0 0 1 1 ... 1 1 1 | 1 1 1 0 0 ... 0 0 0 | 4 |
| 38 | 0 0 0 0 1 ... 1 1 1 | 1 1 1 1 0 ... 0 0 0 | $\overline{5}$ |
| ⋮ | ⋮ | ⋮ | ⋮ |
| 64 | 0 0 0 0 0 ... 1 1 1 | 1 1 1 1 1 ... 0 0 0 | $\overline{31}$ |
| 65 | 0 0 0 0 0 ... 0 1 1 | 1 1 1 1 1 ... 1 0 0 | 32 |
| 66 | 0 0 0 0 0 ... 0 0 1 | 1 1 1 1 1 ... 1 1 0 | $\overline{33}$ |

Fig. 11

| TIME | POSITION OF SIGNAL TRANSITION | COUNTER (UPPER BITS) | ENCODER (LOWER BITS) | TIME DATA |
|---|---|---|---|---|
| 1 | 1 | 000000 | 0, 000000 | 0, 000000, 000000 |
| 2 | 2 | | 0, 000001 | 0, 000000, 000001 |
| 3 | 3 | | 0, 000010 | 0, 000000, 000010 |
| ⋮ | ⋮ | | ⋮ | ⋮ |
| 31 | 31 | | 0, 011110 | 0, 000000, 011110 |
| 32 | 32 | | 0, 011111 | 0, 000000, 011111 |
| 33 | 33 | | 0, 100000 | 0, 000000, 100000 |
| 34 | 1 | | 0, 100001 | 0, 000000, 100001 |
| 35 | 2 | | 0, 100010 | 0, 000000, 100010 |
| 36 | 3 | | 0, 100011 | 0, 000000, 100011 |
| ⋮ | ⋮ | | ⋮ | ⋮ |
| 64 | 31 | | 0, 111111 | 0, 000000, 111111 |
| 65 | 32 | | 1, 000000 | 0, 000001, 000000 |
| 66 | 33 | ↓ | 1, 000001 | 0, 000001, 000001 |
| ⋮ | ⋮ | ⋮ | ⋮ | ⋮ |
| 2113 | 1 | 100000 | 0, 000000 | 0, 100001, 000000 |
| 2114 | 2 | | 0, 000001 | 0, 100001, 000001 |
| ⋮ | ⋮ | | ⋮ | ⋮ |
| 2143 | 31 | | 0, 011110 | 0, 100001, 011110 |
| 2144 | 32 | | 0, 011111 | 0, 100001, 011111 |
| 2145 | 33 | | 0, 100000 | 0, 100001, 100000 |
| 2146 | 1 | | 0, 100001 | 0, 100001, 100001 |
| 2147 | 2 | | 0, 100010 | 0, 100001, 100010 |
| ⋮ | ⋮ | | ⋮ | ⋮ |
| 2176 | 31 | | 0, 111111 | 0, 100001, 111111 |
| 2177 | 32 | | 1, 000000 | 0, 100010, 000000 |
| 2178 | 33 | ↓ | 1, 000001 | 0, 100010, 000001 |
| ⋮ | ⋮ | ⋮ | ⋮ | ⋮ |
| 4159 | 1 | 111111 | 0, 000000 | 1, 000000, 111110 |
| 4160 | 2 | | 0, 000001 | 1, 000000, 111111 |
| ⋮ | ⋮ | | ⋮ | ⋮ |
| 4189 | 31 | | 0, 011111 | 1, 000001, 011100 |
| 4190 | 32 | | 0, 100000 | 1, 000001, 011101 |
| 4191 | 33 | | 0, 100001 | 1, 000001, 011110 |
| 4192 | 1 | | 0, 100010 | 1, 000001, 011111 |
| 4193 | 2 | | 0, 100011 | 1, 000001, 100000 |
| ⋮ | ⋮ | | ⋮ | ⋮ |
| 4222 | 31 | | 0, 111111 | 1, 000001, 111101 |
| 4223 | 32 | | 1, 000000 | 1, 000001, 111110 |
| 4224 | 33 | ↓ | 1, 000001 | 1, 000001, 111111 |

Fig. 13

| TIME | 1ST PRE-ENCODER 25 Q1 ~ Q32 | 2ND PRE-ENCODER 26 Q1 ~ Q32 | OUTPUT DATA FROM ENCODER 27 |
|---|---|---|---|
| 1 | 0 0 0 0 0 ... 0 0 0 0 | 0 0 0 0 0 ... 0 0 0 0 | 0 0 0 0 0 0 |
| 2 | 1 0 0 0 0 ... 0 0 0 0 | 0 0 0 0 0 ... 0 0 0 0 | 0 0 0 0 0 1 |
| 3 | 0 1 0 0 0 ... 0 0 0 0 | 0 0 0 0 0 ... 0 0 0 0 | 0 0 0 0 1 0 |
| 4 | 0 0 1 0 0 ... 0 0 0 0 | 0 0 0 0 0 ... 0 0 0 0 | 0 0 0 0 1 1 |
| 5 | 0 0 0 1 0 ... 0 0 0 0 | 0 0 0 0 0 ... 0 0 0 0 | 0 0 0 1 0 0 |
| ⋮ | ⋮ | ⋮ | ⋮ |
| 31 | 0 0 0 0 0 ... 0 1 0 0 | 0 0 0 0 0 ... 0 0 0 0 | 0 1 1 1 1 0 |
| 32 | 0 0 0 0 0 ... 0 0 1 0 | 0 0 0 0 0 ... 0 0 0 0 | 0 1 1 1 1 1 |
| 33 | 0 0 0 0 0 ... 0 0 0 1 | 0 0 0 0 0 ... 0 0 0 0 | 1 0 0 0 0 0 |
| 34 | 0 0 0 0 0 ... 0 0 0 0 | 0 0 0 0 0 ... 0 0 0 0 | 0 0 0 0 0 0 |
| 35 | 0 0 0 0 0 ... 0 0 0 0 | 1 0 0 0 0 ... 0 0 0 0 | 0 0 0 0 0 1 |
| 36 | 0 0 0 0 0 ... 0 0 0 0 | 0 1 0 0 0 ... 0 0 0 0 | 0 0 0 0 1 0 |
| 37 | 0 0 0 0 0 ... 0 0 0 0 | 0 0 1 0 0 ... 0 0 0 0 | 0 0 0 0 1 1 |
| 38 | 0 0 0 0 0 ... 0 0 0 0 | 0 0 0 1 0 ... 0 0 0 0 | 0 0 0 1 0 0 |
| ⋮ | ⋮ | ⋮ | ⋮ |
| 64 | 0 0 0 0 0 ... 0 0 0 0 | 0 0 0 0 0 ... 0 1 0 0 | 0 1 1 1 1 0 |
| 65 | 0 0 0 0 0 ... 0 0 0 0 | 0 0 0 0 0 ... 0 0 1 0 | 0 1 1 1 1 1 |
| 66 | 0 0 0 0 0 ... 0 0 0 0 | 0 0 0 0 0 ... 0 0 0 1 | 1 0 0 0 0 0 |

Fig. 14

| TIME | POSITION OF SIGNAL TRANSITION | COUNTER (UPPER BITS) | ENCODER (LOWER BITS) | TIME DATA |
|---|---|---|---|---|
| 1 | 1 | 000000 | 0, 00000 | 0, 000000, 00000 |
| 2 | 2 | | 0, 00001 | 0, 000000, 00001 |
| 3 | 3 | | 0, 00010 | 0, 000000, 00010 |
| ⋮ | ⋮ | | ⋮ | ⋮ |
| 31 | 31 | | 0, 00011 | 0, 000000, 11110 |
| 32 | $\overline{32}$ | | 0, 11111 | 0, 000000, 11111 |
| 33 | $\overline{33}$ | ↓ | 1, 00000 | 0, 000001, 00000 |
| 34 | $\overline{1}$ | 000001 | 0, 00000 | 0, 000001, 00001 |
| 35 | $\overline{2}$ | | 0, 00001 | 0, 000001, 00010 |
| 36 | $\overline{3}$ | | 0, 00010 | 0, 000001, 00011 |
| ⋮ | ⋮ | | ⋮ | ⋮ |
| 64 | $\overline{31}$ | | 0, 00011 | 0, 000001, 11111 |
| 65 | 32 | | 0, 11111 | 0, 000010, 00000 |
| 66 | 33 | ↓ | 1, 00000 | 0, 000010, 00001 |
| 1 | 1 | 000010 | 0, 00000 | 0, 000010, 00010 |
| 2 | 2 | | 0, 00001 | 0, 000010, 00011 |
| 3 | 3 | | 0, 00010 | 0, 000010, 00100 |
| ⋮ | ⋮ | | ⋮ | ⋮ |
| 31 | 31 | | 0, 00011 | 0, 000011, 00000 |
| 32 | $\overline{32}$ | | 0, 11111 | 0, 000011, 00001 |
| 33 | $\overline{33}$ | ↓ | 1, 00000 | 0, 000011, 00010 |
| ⋮ | ⋮ | ⋮ | ⋮ | ⋮ |
| 1024 | 1 | 011111 | 0, 00000 | 0, 011111, 11111 |
| 1025 | 2 | | 0, 00001 | 0, 100000, 00000 |
| ⋮ | ⋮ | | ⋮ | ⋮ |
| 1054 | $\overline{31}$ | | 0, 11110 | 0, 100000, 11101 |
| 1055 | $\overline{32}$ | | 0, 11111 | 0, 100000, 11110 |
| 1056 | $\overline{33}$ | ↓ | 1, 00000 | 0, 100000, 11111 |
| 1057 | 1 | 100000 | 0, 00000 | 0, 100001, 00000 |
| 1058 | $\overline{2}$ | | 0, 00001 | 0, 100001, 00001 |
| ⋮ | ⋮ | | ⋮ | ⋮ |
| 1087 | 31 | | 0, 11110 | 0, 100001, 11110 |
| 1088 | $\overline{32}$ | | 0, 11111 | 0, 100001, 11111 |
| 1089 | 33 | ↓ | 1, 00000 | 0, 100010, 00000 |
| ⋮ | ⋮ | ⋮ | ⋮ | ⋮ |
| 2080 | 1 | 111111 | 0, 00000 | 1, 000000, 11111 |
| 2081 | 2 | | 0, 00001 | 1, 000001, 00000 |
| ⋮ | ⋮ | | 0, 00010 | ⋮ |
| 2110 | $\overline{31}$ | | ⋮ | 1, 000001, 11101 |
| 2111 | $\overline{32}$ | | 0, 11111 | 1, 000001, 11110 |
| 2112 | $\overline{33}$ | ↓ | 1, 00000 | 1, 000001, 11111 |

Fig. 16

| TIME | OUTPUT SIGNALS FROM FIRST ROW OF HOLDING CIRCUITS 32 (1 2 3 4 5 ··· 30 31 32) | OUTPUT SIGNALS FROM SECOND ROW OF HOLDING CIRCUITS 33 ($\bar{1}\ \bar{2}\ \bar{3}\ \bar{4}\ \bar{5} \cdots \bar{31}\ \bar{32}\ \bar{33}$) | POSITION OF SIGNAL TRANSITION |
|---|---|---|---|
| 1 | 0 0 0 0 0 ... 0 0 0 | 1 1 1 1 1 ... 1 1 1 | 1 |
| 2 | 1 0 0 0 0 ... 0 0 0 | 0 1 1 1 1 ... 1 1 1 | 2 |
| 3 | 1 1 0 0 0 ... 0 0 0 | 0 0 1 1 1 ... 1 1 1 | 3 |
| 4 | 1 1 1 0 0 ... 0 0 0 | 0 0 0 1 1 ... 1 1 1 | 4 |
| 5 | 1 1 1 1 0 ... 0 0 0 | 0 0 0 0 1 ... 1 1 1 | 5 |
| ⋮ | ⋮ | ⋮ | ⋮ |
| 30 | 1 1 1 1 1 ... 0 0 0 | 0 0 0 0 0 ... 1 1 1 | 30 |
| 31 | 1 1 1 1 1 ... 1 0 0 | 0 0 0 0 0 ... 0 1 1 | 31 |
| 32 | 1 1 1 1 1 ... 1 1 0 | 0 0 0 0 0 ... 0 0 1 | 32 |
| 33 | 1 1 1 1 1 ... 1 1 1 | 0 0 0 0 0 ... 0 0 0 | $\bar{1}$ |
| 34 | 0 1 1 1 1 ... 1 1 1 | 1 0 0 0 0 ... 0 0 0 | $\bar{2}$ |
| 35 | 0 0 1 1 1 ... 1 1 1 | 1 1 0 0 0 ... 0 0 0 | $\bar{3}$ |
| 36 | 0 0 0 1 1 ... 1 1 1 | 1 1 1 0 0 ... 0 0 0 | $\bar{4}$ |
| 37 | 0 0 0 0 1 ... 1 1 1 | 1 1 1 1 0 ... 0 0 0 | $\bar{5}$ |
| ⋮ | ⋮ | ⋮ | ⋮ |
| 63 | 0 0 0 0 0 ... 1 1 1 | 1 1 1 1 1 ... 0 0 0 | $\overline{31}$ |
| 64 | 0 0 0 0 0 ... 0 1 1 | 1 1 1 1 1 ... 1 0 0 | $\overline{32}$ |
| 65 | 0 0 0 0 0 ... 0 0 1 | 1 1 1 1 1 ... 1 1 0 | $\overline{33}$ |

Fig. 17

| TIME | POSITION OF SIGNAL TRANSITION | COUNTER (UPPER BITS) | SIGNAL CONVERTING MEANS (LOWER BITS) | TIME DATA |
|---|---|---|---|---|
| 1 | 1 | 000000 | 0, 000000 | 0, 000000, 000000 |
| 2 | 2 | | 0, 000001 | 0, 000000, 000001 |
| 3 | 3 | | 0, 000010 | 0, 000000, 000010 |
| ⋮ | ⋮ | | ⋮ | ⋮ |
| 31 | 31 | | 0, 011110 | 0, 000000, 011110 |
| 32 | 32 | | 0, 011111 | 0, 000000, 011111 |
| 33 | $\overline{1}$ | | 0, 100000 | 0, 000000, 100000 |
| 34 | $\overline{2}$ | | 0, 100001 | 0, 000000, 100001 |
| 35 | $\overline{3}$ | | 0, 100010 | 0, 000000, 100010 |
| 36 | $\overline{4}$ | | 0, 100011 | 0, 000000, 100011 |
| ⋮ | ⋮ | | ⋮ | ⋮ |
| 63 | $\overline{31}$ | | 0, 111110 | 0, 000000, 111110 |
| 64 | $\overline{32}$ | | 0, 111111 | 0, 000000, 111111 |
| 65 | $\overline{33}$ | ↓ | 1, 000000 | 0, 000001, 000000 |
| ⋮ | ⋮ | | ⋮ | ⋮ |
| 2081 | 1 | 100000 | 0, 000000 | 0, 100000, 100000 |
| 2082 | 2 | | 0, 000001 | 0, 100000, 100001 |
| ⋮ | ⋮ | | ⋮ | ⋮ |
| 2111 | 31 | | 0, 011111 | 0, 100001, 111111 |
| 2112 | 32 | | 0, 100000 | 0, 100001, 000000 |
| 2113 | $\overline{1}$ | | 0, 100001 | 0, 100001, 000001 |
| 2114 | $\overline{2}$ | | 0, 100010 | 0, 100001, 000010 |
| 2115 | $\overline{3}$ | | 0, 100011 | 0, 100001, 000011 |
| 2116 | $\overline{4}$ | | 0, 100100 | 0, 100001, 000100 |
| ⋮ | ⋮ | | ⋮ | ⋮ |
| 2144 | $\overline{32}$ | | 0, 111111 | 0, 100001, 011111 |
| 2145 | $\overline{33}$ | ↓ | 1, 000000 | 0, 100001, 100000 |
| ⋮ | ⋮ | ⋮ | ⋮ | ⋮ |
| 4096 | 1 | 111111 | 0, 000000 | 0, 111111, 100001 |
| 4097 | 2 | | 0, 000001 | 0, 000000, 000000 |
| ⋮ | ⋮ | | ⋮ | ⋮ |
| 4126 | 31 | | 0, 011111 | 1, 000000, 011101 |
| 4127 | 32 | | 0, 100000 | 1, 000000, 011110 |
| 4128 | $\overline{1}$ | | 0, 100001 | 1, 000000, 011111 |
| 4129 | $\overline{2}$ | | 0, 100010 | 1, 000000, 100000 |
| 4130 | $\overline{3}$ | | 0, 100011 | 1, 000000, 100001 |
| 4131 | $\overline{4}$ | | 0, 100100 | 1, 000000, 100010 |
| ⋮ | ⋮ | | ⋮ | ⋮ |
| 4159 | $\overline{31}$ | | 0, 111111 | 1, 000000, 111110 |
| 4160 | $\overline{32}$ | ↓ | 1, 000000 | 1, 000000, 111111 |

TIME COUNTING CIRCUIT AND PULSE SIGNAL GENERATING METHOD

BACKGROUND OF THE INVENTION

The present invention relates to a time counting circuit for measuring such time as the pulse spacing of a pulse signal and to a method of generating a plurality of pulse signals.

There have been rising hopes for the use of time counting circuits for measuring such time as the pulse spacing of a pulse signal in the field of digital communication and the like. In recent years, it has become possible to mount a time counting circuit composed of a CMOS transistor in conjunction with other digital circuits on a single chip, which has accomplished a significant reduction in the cost of manufacturing semiconductor devices.

A time counting circuit which exhibits further stabilized operation with higher accuracy may also find extensive application in various fields including the demodulation of FM signals and the demodulation of bus signals in an LSI. Because of its capability of measuring extremely short time with accuracy and stability, the use of the time counting circuit for greatly reducing the number of buses in the LSI is particularly awaited.

FIG. 18 illustrates a structure of a conventional time counting circuit, in which are shown: an inverter ring 51; a row of holding circuits 52; signal converting means 53; time-difference operating circuit 54; a counter 55a; and a counter-output holding circuit 55b. A pulse signal to be measured is inputted to a pulse-signal input terminal and data representing the pulse spacing of the inputted pulse signal is outputted from an operation-result output terminal.

The time counting circuit shown in FIG. 18 includes the inverter ring 51 composed of a plurality of delay circuits each consisting of two inverters and one delay circuit consisting of three inverters (the final delay circuit in FIG. 18), which are connected in a ring configuration. Since the inverter ring 51 is composed of an odd number of inverters, so-called oscillation is observed whereby one signal transition occurs after another as though seemingly moving along the inverter ring 51 with the passage of time, resulting in circulations around the inverter ring 51. Therefore, time can be measured by examining variations in the output voltages from the individual delay circuits.

On the rising edge of the pulse signal to be measured, output signals from the individual delay circuits composing the inverter ring 51 are held in flip-flops (FFs) composing the row of holding circuits 52 and outputted to the signal converting means 53, which converts the output signals from the row of holding circuits 52 to data and outputs it to the time-difference operating circuit 54. The counter 55a counts the number of circulations of signal transition around the inverter ring 51 and outputs count data to the time-difference operating circuit 54 via the counter-output holding circuit 55b (see "Time-to-Digital Converter LSI" Technical Report of IEICE, ICD93-77 (1993-08)).

However, the conventional time counting circuit has the following disadvantages.

To cause oscillation in the inverter ring, an odd number of inverters should necessarily be provided therein. To implement a signal processing circuit of simple structure, a power-of-two number of delay circuits are preferably included in the inverter ring. Accordingly, the inverter ring comprises delay circuits of different structures in the conventional time counting circuit, as shown in FIG. 18.

In this case, however, it is difficult to equalize signal delay times in the individual delay circuits composing the inverter ring. Even if the inverter ring is designed so that signal delay times in the individual delay circuits become equal, signal delay times may vary differently in the delay circuits of different structures when a power-source voltage varies.

To eliminate the disadvantages, there can be proposed a method wherein time counting is performed by regarding one inverter as one delay circuit. In accordance with the method, holding circuits are connected to the respective output terminals of the inverters composing the inverter ring and output signals from the individual holding circuits are used to perform time counting.

FIG. 19(a) shows transitions of respective output signals from an odd number of identical inverters composing an inverter ring. In the drawing, it is assumed that the output signal from the 2nd inverter falls after the time $t_1$ elapsed from the rising edge of the output signal from the 1st inverter. In short, a delay time in the 2nd inverter is indicated by $t_1$. Likewise, respective delay times in the 3rd to 7th inverters are indicated by $t_2$ to $t_6$.

It is assumed here that a pulse signal to be measured rises at the time $T_1$. At that time, the logic levels of the output signals from the 1st and 2nd inverters are HIGH successively. It is also assumed that the pulse signal to be measured rises again at the time $T_2$. At that time, the logic levels of the output signals from the 6th and 7th inverters are LOW successively. From the foregoing description, it will be understood that signal transition circulating around the inverter ring has advanced from the 1st inverter to the 6th inverter during the period between the times $T_1$ and $T_2$.

The time required by signal transition to advance from the 1st inverter to the 6th inverter can be obtained by adding up respective delay times in the 2nd to 6th inverters, which is given by $(t_1+t_2+t_3+t_4+t_5)$. Hence, the time $(T_2-T_1)$ representing the pulse width is given by $(t_1+t_2+t_3+t_4+t_5)$. If each of the delay times in the individual inverters is assumed to be 1 ns, $t_1=t_2=t_3=t_4=t_5=1$ ns are satisfied so that the time $(T_2-T_1)=5$ ns is satisfied.

The duration of time recognized as the time $T_1$ by the inverter ring is equal to the delay time $t_1$ in the 2nd inverter. The duration of time recognized as the time $T_2$ by the inverter ring is equal to the delay time $t_6$ in the 7th inverter. When the delay times in the individual inverters are equal, therefore, the pulse width can be measured by using the delay times as increments of time.

In practice, however, it is not necessarily easy to equalize the delay times in the individual inverters partly because the rise time of the output signal from the inverter is not necessarily equal to the fall time thereof.

If the inverter is composed of a CMOS inverter, the adjustment of the threshold voltage of the PMOS transistor and the adjustment of the threshold voltage of the NMOS transistor are performed in different processes. On the other hand, the rise time of the output voltage from the inverter is mainly determined by the threshold voltage of the PMOS transistor, while the fall time of the output voltage from the inverter is mainly determined by the threshold voltage of the NMOS transistor. Thus, different rise and fall times of the output voltage from the inverter, which is a common phenomenon, results from the manufacturing process.

FIG. 19(b) illustrates different delay times in the individual inverters when the rise time of the output signal from the inverter is different from the fall time thereof. In the drawing, the horizontal axis indicates time, the vertical axis indicates voltage, the voltage $V_{DD}$ indicates power-source voltage, and the voltage $V_T$ indicates the threshold voltage of each of the holding circuits connected to the individual inverters. The solid lines on the graph indicate transitions of the output signals from the individual inverters composing the inverter ring. The numeric characters accompanying the rising and falling edges on the graph indicate the stages of the inverters. The holding circuit holds an input voltage higher than the threshold voltage $V_T$ as a logic level "1", while holding an input voltage lower than the threshold voltage $V_T$ as a logic level "0".

As shown in FIG. 19(b), when the fall time of the output signal from the inverter is longer than the rise time thereof, the delay times $t_1$, $t_3$, and $t_5$ are longer than 1 ns and the delay times $t_2$, $t_4$, and $t_6$ are shorter than 1 ns.

If $t_1=t_3=t_5=1.5$ ns and $t_2=t_4=t_6=0.5$ ns are assumed to be satisfied, the duration of time recognized as the time $T_1$ is 1.5 ns and the duration of time recognized as the time $T_2$ is 0.5 ns, which indicates that the accuracy of time measurement is not constant.

Even if an inverter ring with equal rise time and fall time can be manufactured, the threshold voltage of the holding circuit varies with variations in power-source voltage and in temperature, so that the delay times in the individual inverters are not equal. To eliminate the problem, means for controlling the inverter ring by detecting variations in power-source voltage and in temperature should be provided in a time counting circuit, which increases circuit size and power consumption accordingly.

SUMMARY OF THE INVENTION

The present invention provides a time counting circuit comprising: a delay circuit ring composed of a plurality of delay circuits around which signal transition is caused to circulate by oscillation and capable of outputting a group of signals sequentially rising or falling at equal time intervals; and counting means for detecting, from the group of signals, the position of signal transition in the delay circuit ring at a certain time. The arrangement enables the obtaining of time data with high accuracy even when the rise time of the output signal from each of the delay circuits composing the delay circuit ring is different from the fall time thereof.

Specifically, the time counting circuit according to the present invention comprises: a differential inverter ring composed of an odd number of differential inverters connected in a ring configuration around which signal transition is caused to circulate by oscillation, each of the differential inverters having a normal output terminal and an inverting output terminal connected to the respective inverting input terminal and normal input terminal of the subsequent differential inverter; and counting means for receiving at least one of a first signal group composed of normal output signals from the odd-numbered differential inverters in the differential inverter ring and inverted output signals from the even-numbered differential inverters in the differential inverter ring and a second signal group composed of inverted output signals from the odd-numbered differential inverters in the differential inverter ring and normal output signals from the even-numbered differential inverters in the differential inverter ring and obtaining, based on at least one of the first and second signal groups, the position of signal transition in the differential inverter ring at a certain time.

Since oscillation is occurring in the differential inverter ring, when a normal output signal from a certain differential inverter rises and an inverted output signal therefrom falls, a normal output signal from the subsequent differential inverter falls and an inverted output signal therefrom rises after the delay time in the differential inverter. The individual signals in the first signal group composed of the normal output signals from the odd-numbered differential inverters and the inverted output signals from the even-numbered differential inverters rise or fall sequentially with the passage of time. The individual signals in the second signal group composed of the inverted output signals from the odd-numbered differential inverters and the normal output signals from the even-numbered differential inverters also rise or fall sequentially with the passage of time. If it is assumed that the differential inverters are of identical structure and that the delay times therein are equal, it follows that the individual signals in the first signal group rise or fall sequentially at equal time intervals and the individual signals in the second signal group also rise or fall sequentially at equal time intervals. Consequently, time data can be obtained with high accuracy by using the counting means for detecting the position of signal transition in the differential inverter ring at a certain time based on at least one of the first and second signal groups, even when the rise time of the output signal from the differential inverter is different from the fall time thereof.

Preferably, the counting means receives the first and second signal groups, selects one of the first and second signal groups in which the individual signals rise sequentially, and obtains, based on the selected signal group, the position of signal transition in the differential inverter ring at a certain time. Since the counting means selects either one of the first and second signal groups in which the individual signals rise at equal time intervals as described above, data can be obtained with high accuracy even when the rise time of the output signal from the differential inverter is different from the fall time thereof.

Preferably, the counting means receives the first and second signal groups, selects one of the first and second signal groups in which the individual signals fall sequentially, and obtains, based on the selected signal group, the position of signal transition in the differential inverter ring at a certain time. Since the counting means selects either one of the first and second signal groups in which the individual signals fall at equal time intervals as described above, data can be obtained with high accuracy even when the rise time of the output signal from the differential inverter is different from the fall time thereof.

Preferably, the counting means comprises: a first row of holding circuits composed of a plurality of holding circuits connected to the respective normal output terminals of the odd-numbered differential inverters in the differential inverter ring and to the respective inverting output terminals of the even-numbered differential inverters in the differential inverter ring, the first row of holding circuits holding the output signals from the differential inverters to which the individual holding circuits are connected on the edge of a pulse signal to be measured and outputting the plurality of held signals as a first row of signals; a second row of holding circuits composed of a plurality of holding circuits connected to the respective inverting output terminals of the odd-numbered differential inverters in the differential inverter ring and to the respective normal output terminals of the even-numbered differential inverters in the differential inverter ring, the second row of holding circuits holding the output signals from the differential inverters to which the individual holding circuits are connected on the edge of the pulse signal to be measured and outputting the plurality of held signals as a second row of signals; and signal converting means for converting the first row of signals outputted from the first row of holing circuits and the second row of signals outputted from the second row of holding circuits to numeric data representing the position of signal transition in the differential inverter ring and outputting the numeric data, the time counting circuit obtaining time between the edges of the pulse signal to be measured based on the numeric data outputted from the signal converting means.

In the arrangement, the first group of signals composed of the normal output signals from the odd-numbered differential inverters and of the inverted output signals from the even-numbered differential inverters and inputted to the first row of holding circuits rise or fall sequentially at equal time intervals. Likewise, the second group of signals composed of the inverted output signals from the odd-numbered differential inverters and of the normal output signals from the even-numbered differential inverters and inputted to the second row of holding circuits also rise or fall sequentially at equal time intervals. The position of signal transition in the differential inverter ring on the edge of the pulse signal to be measured is obtained based on the first and second rows of signals held by the first and second rows of holding circuits on the edge of the pulse signal to be measured. Accordingly, increments of time for measuring the timing of the edge of the pulse signal to be measured become constantly equal even when the rise time of the output signal from the differential inverter is different from the fall time thereof. The first and second rows of signals are converted by the signal converting means to numeric data representing the position of signal transition in the differential inverter ring and the time interval between the edges of the pulse signal to be measured is calculated based on the numeric data, resulting in time measurement with high accuracy.

Specifically, a time counting circuit according to the present invention comprises: an inverter ring composed of an odd number of inverters connected in a ring configuration around which signal transition is caused to circulate by oscillation; and counting means for receiving at least one of a first signal group composed of output signals from the even-numbered inverters in the inverter ring and a second signal group composed of output signals from the odd-numbered inverters in the inverter ring and obtains, based on the received signal group, the position of signal transition in the inverter ring at a certain time.

Since oscillation is occurring in the inverting ring, when an input signal to a certain inverter rises, an output signal therefrom falls after the delay time in the inverter. The individual signals in the first signal group composed of the output signals from the even-numbered inverters sequentially rise or fall with the passage of time. The individual signals in the second signal group composed of the output signals from the odd-numbered inverters sequentially rise or fall with the passage of time. If it is assumed that the individual inverters are of identical structure and that the delay times therein are equal, it follows that the individual signals in the first signal group rise or fall sequentially at equal time intervals and the individual signals in the second signal group also rise or fall sequentially at equal time intervals. Consequently, time data can be obtained with high accuracy by detecting the position of signal transition in the inverter ring at a certain time based on at least one of the first and second signal groups even when the rise time of the output signal from the inverter is different from the fall time thereof.

Preferably, the counting means receives the first and second signal groups, selects one of the first and second signal groups in which the individual signals rise sequentially, and obtains, based on the selected signal group, the position of signal transition in the inverter ring at a certain time. Since the counting means selects either one of the first and second signal groups in which the individual signals rise at equal time intervals as described above, time data can be obtained with high accuracy even when the rise time of the output signal from the inverter is different from the fall time thereof.

Preferably, the counting means receives the first and second signal groups, selects one of the first and second signal groups in which the individual signals fall sequentially, and obtains, based on the selected signal group, the position of signal transition in the inverter ring at a certain time. Since the counting means selects either one of the first and second signal groups in which the individual signals fall at equal time intervals, as described above, time data can be obtained with high accuracy even when the rise time of the output signal from the inverter is different from the fall time thereof.

Preferably, the counting means comprises: a first row of holding circuits composed of a plurality of holding circuits connected to the respective output terminals of the even-numbered inverters in the inverter ring, the first row of holding circuits holding the output signals from the inverters to which the individual holding circuits are connected on the edge of a pulse signal to be measured and outputting the plurality of held signals as a first row of signals; a second row of holding circuits composed of a plurality of holding circuits connected to the respective output terminals of the odd-numbered inverters in the inverter ring, the second row of holding circuits holding the output signals from the inverters to which the individual holding circuits are connected on the edge of the pulse signal to be measured and outputting the plurality of held signals as a second row of signals; and signal converting means for converting the first row of signals outputted from the first row of holding circuits and the second row of signals outputted from the second row of holding circuits to numeric data representing the position of signal transition in the inverter ring and outputting the numeric data.

In the arrangement, the first group of signals composed of the output signals from the even-numbered inverters inputted to the first row of holding circuits rise or fall sequentially at equal time intervals. Likewise, the second group of signals composed of the output signals from the odd-numbered inverters inputted to the second row of holding circuits also rise or fall sequentially at equal time intervals. The position of signal transition in the inverter ring on the edge of the pulse signal to be measured is obtained based on the first and second rows of signals held by the first and second rows of holding circuits on the edge of the pulse signal to be measured. Consequently, increments of time for measuring the timing of the edge of the pulse signal to be measured become constantly equal even when the rise time of the output signal from the inverter is different from the fall time thereof. The first and second rows of signals are converted by the signal converting means to numeric data representing the position of signal transition in the inverter ring and the time interval between the edges of the pulse signal to be measured is obtained based on the numeric data, resulting in time measurement with high accuracy.

A method of generating a plurality of pulse signals according to the present invention comprises the steps of: providing a row of differential inverters composed of a plurality of differential inverters connected in series along which signal transition propagates, each of the differential inverters having a normal output terminal and an inverting output terminal connected to the respective inverting input terminal and normal input terminal of the subsequent differential inverter; and fetching alternately normal output signals and inverted output signals from the differential inverters composing the row of differential inverters in the order in which the differential inverters are arranged such that the fetched signals are used as the plurality of pulse signals.

In accordance with the method, there can be obtained the plurality of pulse signals which rise or fall sequentially. When the individual differential inverters are of identical structure and the delay times therein are equal, the time intervals between the rising or falling edges of the plurality of pulse signals are constantly equal.

Alternatively, the method of generating a plurality of pulse signals according to the present invention comprises the steps of: providing an inverter ring composed of an odd number of inverters connected in a ring configuration around which signal transition circulates; and fetching output signals from every two inverters composing the inverter ring such that the fetched signals are used as the plurality of pulse signals.

In accordance with the method, there can be obtained the plurality of pulse signals which rise or fall sequentially. When the individual inverters are of identical structure and the delay times therein are equal, the time intervals between the rising or falling edges of the plurality of pulse signals become constantly equal.

Alternatively, a method of generating a plurality of pulse signals according to the present invention comprises the steps of: providing a differential inverter ring composed of an odd number of differential inverters connected in a ring configuration around which signal transition circulates, each of the differential inverters having a normal output terminal and an inverting output terminal connected to the respective inverted input terminal and normal input terminal of the subsequent differential inverter; and fetching alternately normal output signals and inverted output signals from the differential inverters composing the differential inverter ring in the order in which the differential inverters are arranged such that the fetched signals are used as the plurality of pulse signals.

In accordance with the method, there can be obtained the plurality of pulse signals which rise or fall sequentially. When the individual differential inverters are of identical structure and the delay times therein are equal, the time intervals between the rising or falling edges of the plurality of pulse signals become constantly equal.

BRIEF DESCRIPTION OF THE DRAWINGS

FIG. 6 shows the parameters of individual transistors composing the differential inverters in the simulation mentioned above;

FIG. 10 shows the relationship between output signals from first and second rows of holding circuits 12 and 13 and time;

FIG. 11 shows the relationship between time data obtained by a time-difference operating circuit 21 and time;

FIG. 13 shows output data from a first pre-encoder 25, output data from a second pre-encoder 26, and output data from an encoder 27 at different times;

FIG. 14 shows the relationship between time data obtained by a time-difference operating circuit 28 and time;

FIG. 16 shows the relationship between output signals from first and second rows of holding circuits 32 and 33 and time;

FIG. 17 shows the relationship between time data obtained by a time-difference operating circuit 35 and time;

DETAILED DESCRIPTION OF THE DRAWINGS
(First Embodiment)

Figure 1:
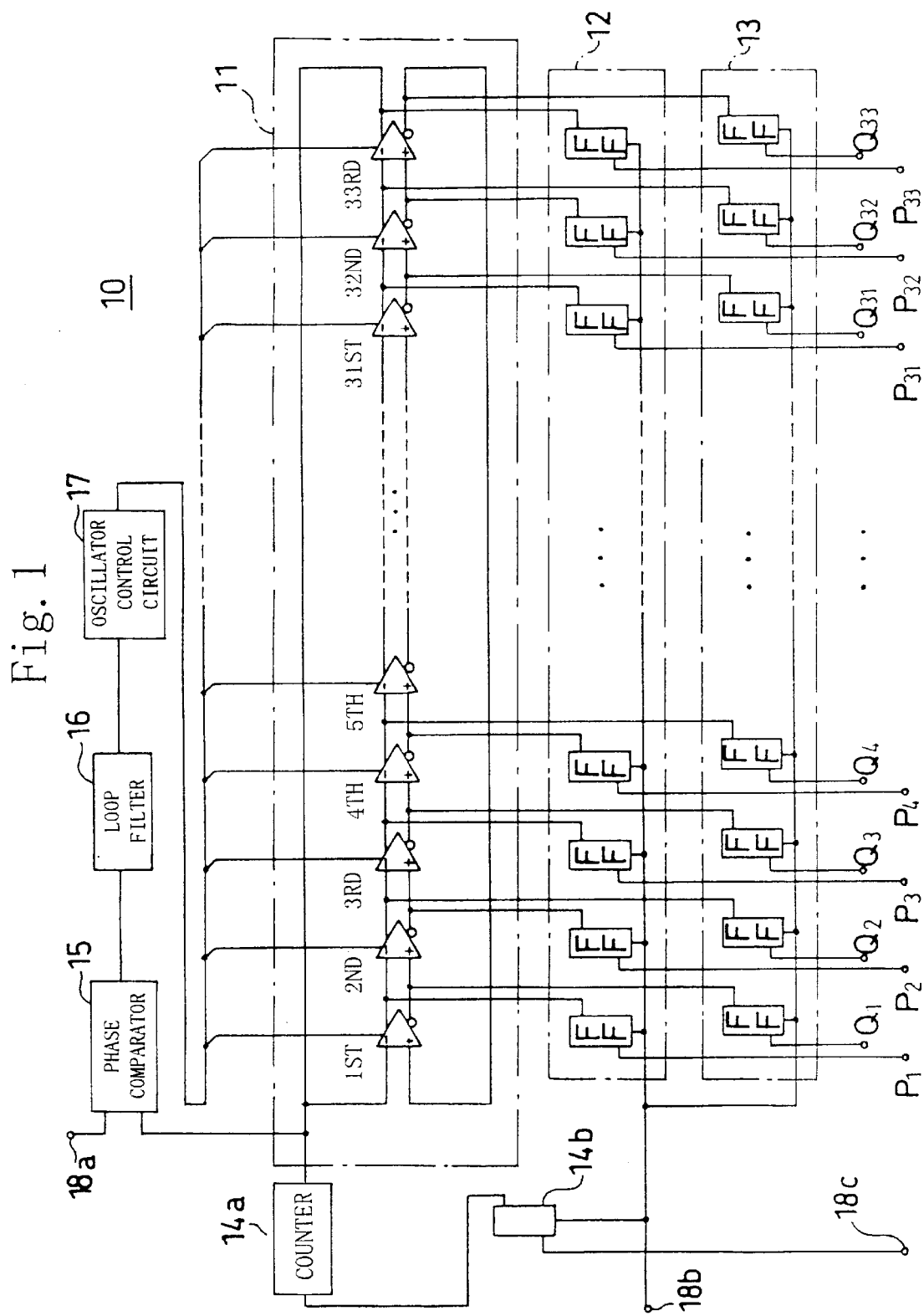
FIG. 1 shows the structure of a principal circuit 10 in a time counting circuit according to a first embodiment of the present invention.

FIG. 1 illustrates the structure of a principal portion of a time counting circuit according to a first embodiment of the present invention, in which are shown: a differential inverter ring 11 as a delay circuit ring; a first row of holding circuits 12; a second row of holding circuits 13; a counter 14*a*; a counter-output holding circuit 14*b*; a phase comparator 15; a loop filter 16; an oscillator control circuit 17; a reference-pulse-signal input terminal 18*a*; an input terminal 18*b* for pulse signal to be measured; a circulation-number-data output terminal 18*c*; output terminals $P_1$ to $P_{33}$ for signals from the first row of holding circuits 12; and output terminals $Q_1$ to $Q_{33}$ for signals from the second row of holding circuits 13.

The differential inverter ring 11 is composed of 33 (=$2^5$+1) differential inverters of identical structure connected in a ring configuration. Each of the differential inverters has a normal output terminal connected to the inverting input terminal of the subsequent differential inverter and an inverting output terminal connected to the normal input terminal of the subsequent differential inverter. The final (33rd) differential inverter has a normal output terminal connected to the inverted input terminal of the 1st differential inverter and an inverting output terminal connected to the normal input terminal of the 1st differential inverter. With the arrangement, oscillation occurs in the differential inverter ring 11 and signal transition circulates around the differential inverter ring 11.

The first row of holding circuits 12 is composed of thirty-three holding circuits connected to the individual normal output terminals of the odd-numbered differential inverters and to the individual inverting output terminals of the even-numbered differential inverters. The second row of holding circuits 13 is composed of thirty-three holding circuits connected to the individual inverting output terminals of the odd-numbered differential inverters and to the normal output terminals of the even-numbered differential inverters. Each of the holding circuits holds a signal at the output terminal of the differential inverter to which it is connected on the rising edge of the pulse signal to be measured, which has been inputted to the pulse-signal input terminal 18b, and outputs the held signals from the signal output terminals $P_1$ to $P_{33}$ and $Q_1$ to $Q_{33}$.

The counter 14a is connected to the normal output terminal of the 33rd differential inverter and counts the number of circulations of signal transition around the differential inverter ring 11. The counter-output holding circuit 14b holds count data from the counter 14a on the rising edge of the pulse signal to be measured, which has been inputted to the pulse-signal input terminal 18b, and outputs the held count data from the circulation-number-data output terminal 18c.

Delay times in the individual differential inverter are controlled by the phase comparator 15, the loop filter 16, and the oscillator control circuit 17. The phase comparator 15 detects a phase difference between a reference pulse signal inputted to the reference-pulse-signal input terminal 18a and a normal output signal from the 33rd differential inverter. The loop filter 16 averages an output signal from the phase comparator 15 outputted in pulse waveforms and outputs the obtained voltage. The oscillator control circuit 17 adjusts the delay times in the individual differential inverters based on the voltage outputted from the loop filter 16. The delay times in the individual differential inverters are adjusted continuously till there is no more phase difference between the reference pulse signal and the normal output signal from the 33rd differential inverter.

Consequently, the frequency of the reference pulse signal becomes equal to the frequency of the output signal from the 33rd differential inverter. The use of an output pulse signal from a crystal oscillator oscillating at a given frequency as the reference pulse signal enables oscillation at a given frequency in the differential inverter ring 11, so that the delay times in the individual differential inverters are controlled with accuracy.

Figure 2:
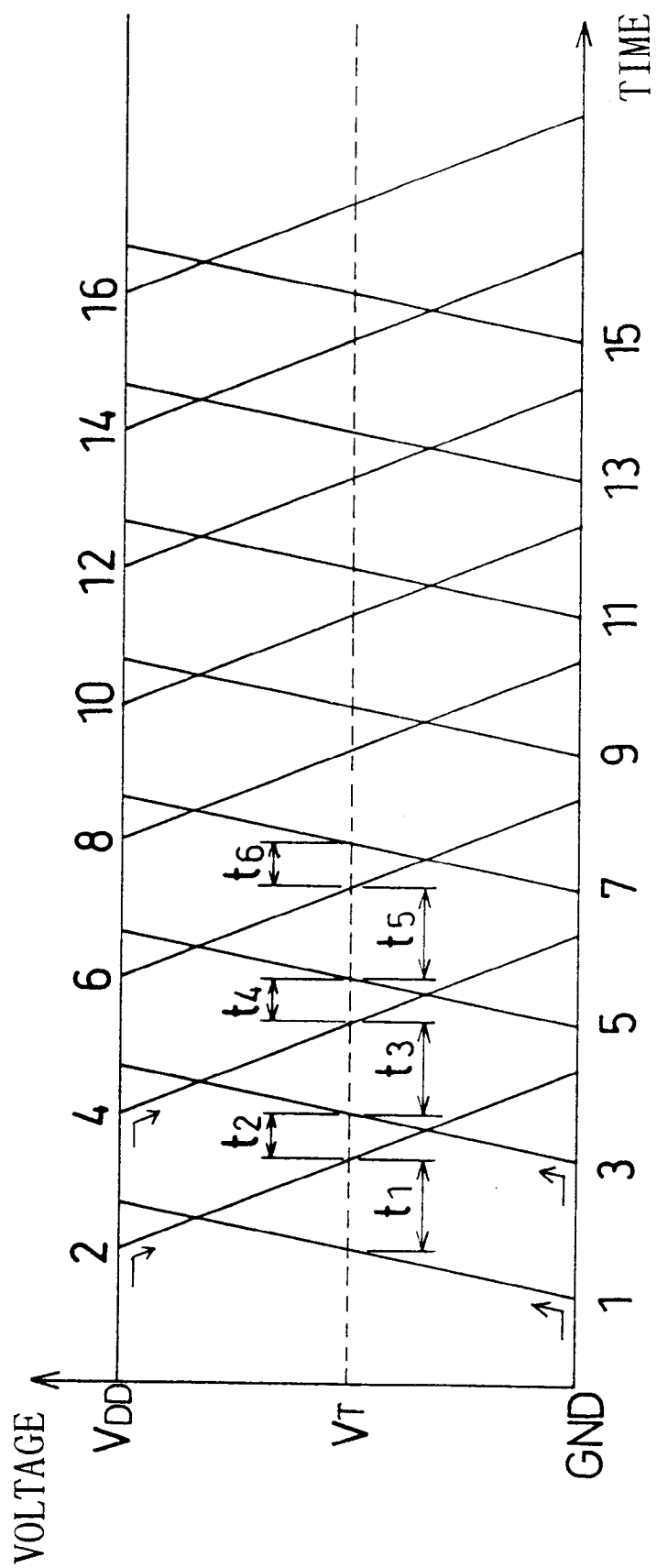
FIG. 2 is a graph showing transitions of normal output signals from individual differential inverters in a differential inverter ring 11 shown in FIG. 1.

FIG. 2 is a graph showing transitions of normal output signals from the individual differential inverters composing the differential inverter ring 11. In the drawing, the horizontal axis indicates time, the vertical axis indicates voltage, $V_{DD}$ indicates power-source voltage, $V_T$ indicates the threshold voltage of each of the holding circuits composing the first and second rows of holding circuits 12 and 13, and GND indicates the ground potential. The numeric characters accompanying the solid lines in the drawing indicate the stages of the differential inverters for outputting the normal output signals.

As shown in FIG. 2, signal transition advances in such a manner that the rising edge of a normal output signal from the 1st differential inverter is followed by the falling edge of a normal output signal from the 2nd differential inverter, which is then followed by the rising edge of a normal output signal from the 3rd differential inverter.

However, the rise time of the output signal from each of the differential inverters is not necessarily equal to the fall time thereof. Different rise and fall times of the output signal is caused by the factor deriving from the manufacturing process, similarly to the conventional CMOS inverter described above, or by a factor deriving from the circuit structure of the differential inverter, which will be described later.

Because of different rise and fall times of the output signal, the delay times $t_1$ to $t_6$ in the individual differential inverters are not equal. Moreover, the delay times $t_1$ to $t_6$ are varied differently by variations in the threshold voltage $V_T$ of the holding circuit.

Figure 3:
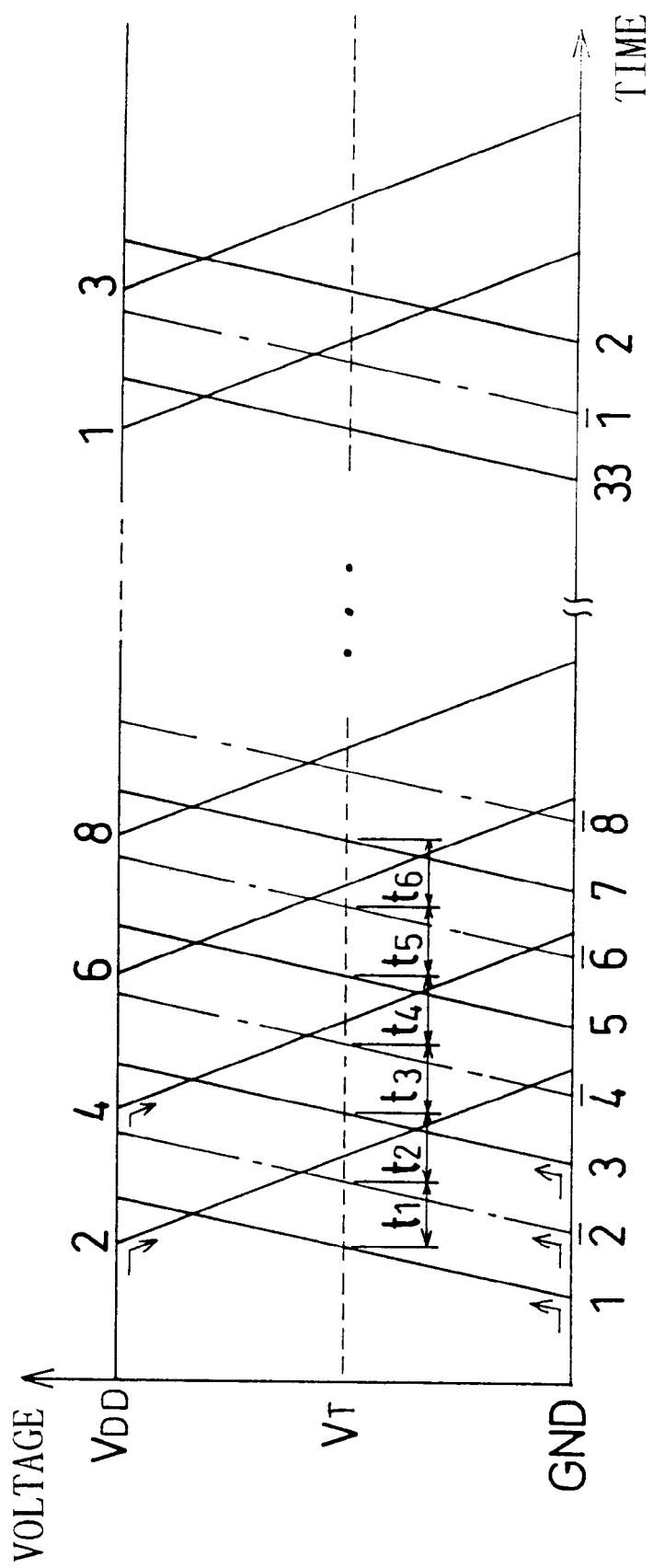
FIG. 3 is a graph showing the transitions of the normal output signals from the individual differential inverters and transitions of inverted output signals from the even-numbered differential inverters in the differential inverter ring 11 shown in FIG. 1.

FIG. 3 is a graph showing transitions of inverted output signals from the even-numbered differential inverters as well as the transitions of the signals shown in FIG. 2. In FIG. 3, the transitions of the inverted output signals are indicated by the dash-dot lines and the barred numeric characters accompanying the dash-dot lines representing rising edges on the graph indicate the stages of the differential inverters outputting the inverted output signals. As will be appreciated from the drawing, both the normal output signals from the odd-numbered differential inverters and the inverted output signals from the even-numbered differential inverters serve as rise signals.

Therefore, if the normal output signals from the odd-numbered differential inverters and the inverted output signals from the even-numbered differential inverters are used for time counting, the delay times $t_1$ to $t_6$ in the individual differential inverters become equal. Moreover, the delay times $t_1$ to $t_6$ are not varied either by the variations in the threshold voltage $V_t$ of the holding circuit. The time counting circuit according to the present embodiment utilizes the foregoing fact to improve the accuracy of time counting.

A description will be given to the factor causing different rise and fall times of the output signal from the differential inverter, which has derived from the circuit structure of the differential inverter.

Figure 4:
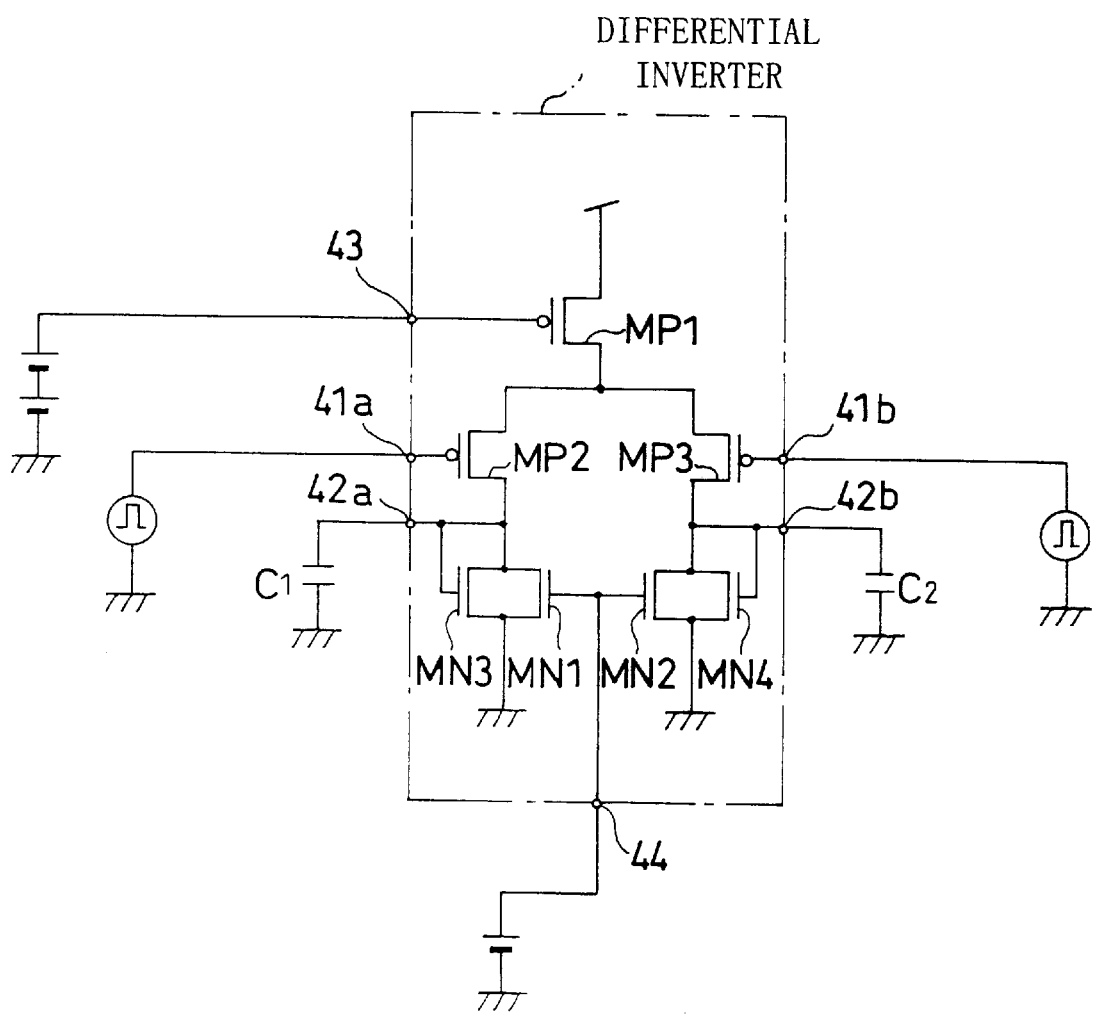
FIG. 4 is a circuit diagram showing the structure of the differential inverter.

FIG. 4 is a circuit diagram illustrating the circuit structure of a typical differential inverter composed of three PMOS transistors $MP_1$ to $MP_3$ and four NMOS transistors $MN_1$ to $MN_4$. In the drawing are shown: a normal input terminal 41a; an inverting input terminal 41b; a normal output terminal 41a; and an inverting output terminal 41b. When the differential inverter is used in the differential inverter ring 11 as shown in FIG. 1, the normal input terminal 41a and inverting input terminal 41b of the differential inverter of concern are connected to the inverting output terminal 41b and normal output terminal 41a of the preceding differential inverter, while the normal output terminal 41a and inverting output terminal 41b of the differential inverter of concern are connected to the inverting input terminal 41b and normal input terminal 41a of the subsequent differential inverter. The delay time in the differential inverter is adjusted by a voltage applied to a control terminal 43. When the differential inverter is used in the differential inverter ring 11, a voltage outputted from the oscillator control circuit 17 is applied to the control terminal 43. A given potential is maintained at a terminal 44.

For convenience, it is assumed here that capacitances $C_1$ and $C_2$ are connected to the normal output terminal 41a and to the inverting output terminal 41b, respectively, while a given voltage is supplied to the control terminal 43.

It is also assumed that a rise signal is inputted to the normal input terminal 41a and a fall signal is inputted to the inverting input terminal 41b.

When the potential at the normal input terminal 41a is LOW, the PMOS transistor $MP_2$ is in the conductive state and the potential at the normal output terminal 41a is HIGH. When the potential at the inverting input terminal 41b is HIGH, the PMOS transistor $MP_3$ is in the nonconductive state and the potential at the inverting output terminal 41b is LOW.

When the potential at the normal input terminal 41a becomes HIGH, the PMOS transistor $MP_2$ shifts to the nonconductive state. At that time, charges accumulated in the capacitance $C_1$ connected to the normal output terminal 41a are allowed to flow through the NMOS transistors $MN_1$ and $MN_3$ which serve as nonlinear resistances, so that the flowing current is varied by the voltage of the normal output terminal 41a.

When the potential at the inverting input terminal 41b becomes LOW, the PMOS transistor $MP_3$ shifts to the conductive state. At that time, a current from the PMOS transistor $MP_1$ as a constant current source is allowed to flow into the capacitance $C_2$ connected to the inverting output terminal 41b, so that the voltage of the inverting output terminal 41b increases at a substantially constant rate.

In short, the voltage of the normal output terminal 41a is reduced through the discharging of the capacitance by the nonlinear current, while the voltage of the inverting output terminal 41b is increased through the charging of the capacitance by the constant current. Since the rise and fall times of the output signal are thus determined by the different phenomena, they are not equal to each other.

Figure 5:
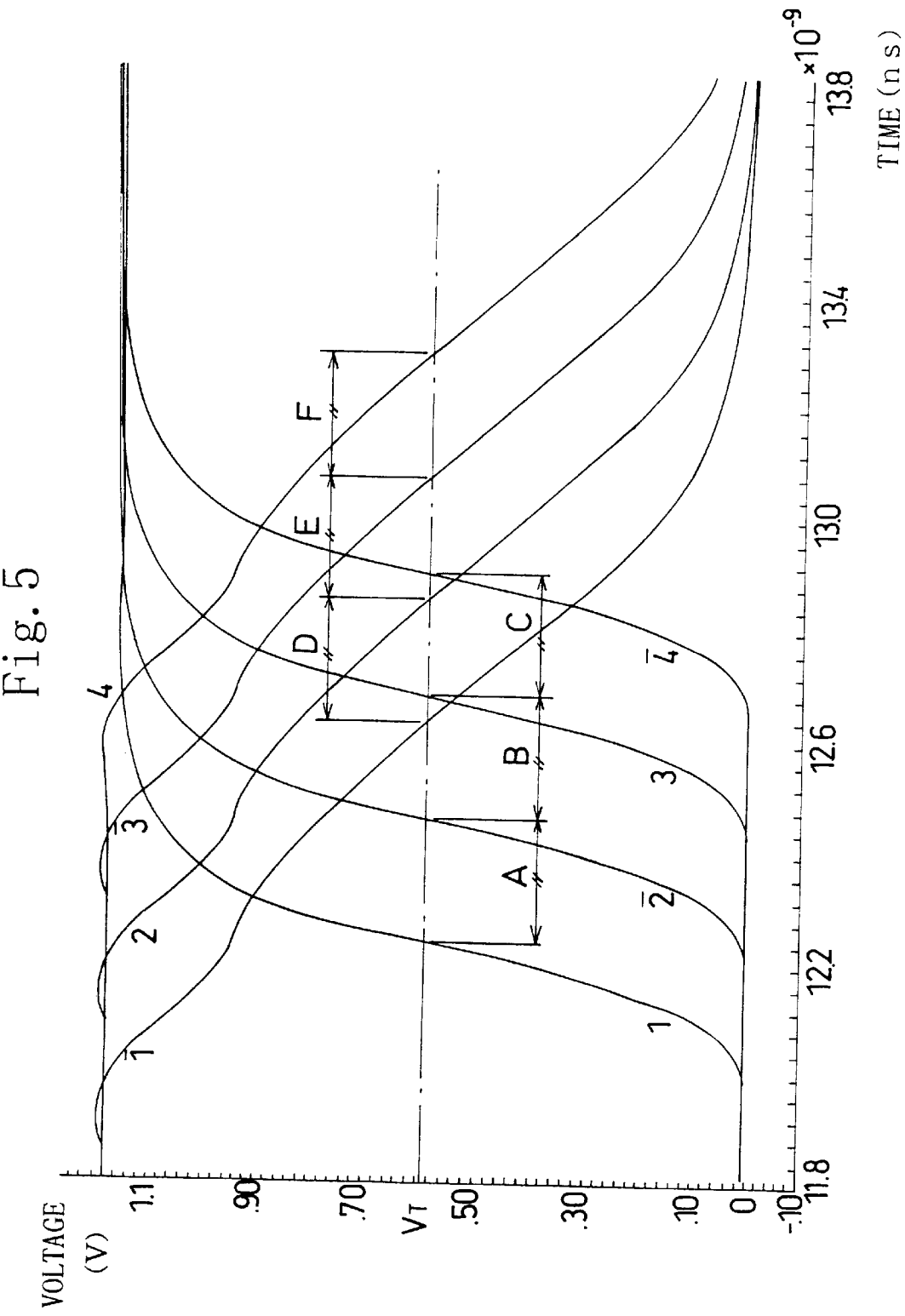
FIG. 5 is a graph showing the result of simulating the transitions of the output signals from the individual differential inverters when the differential inverter ring 11 is composed of the differential inverters shown in FIG. 4.

FIG. 5 is a graph showing the result of simulating the transitions of the output signals from the individual differential inverters when the differential inverter ring 11 is composed of the differential inverters shown in FIG. 4. The simulation tool used is Spectre (Ver 4. 3. 2. 30, commercially available from CADENCE DESIGN SYSTEMS, INC.) and the model of the transistor used is BS1M1. FIG. 6 shows the parameters of the individual transistors composing the differential inverter. In the simulation, the power-source voltage and the temperature are assumed to be 5 V and 27° C. In FIG. 5, the horizontal axis indicates time [ns] and the vertical axis indicates voltage [V]. The numeric characters on the graph indicate the stages of the differential inverters and output signals therefrom, of which the barred ones indicate inverted output signals and the unbarred ones indicate normal output signals.

As can be understood from FIG. 5, although the rise times of the individual signals are greatly different from the fall times thereof, the rise times are substantially equal to each other and the fall times are also substantially equal to each other. Hence, the delay times A, B, and C based only on the rise signals are equal to each other and the delay times D, E, and F based only on the fall signals are also equal to each other.

Accordingly, by fetching alternately the normal output signals and inverted output signals from the individual differential inverters, there can be obtained a set of pulse signals composed only of a combination of rise signals and having rising edges at equal time intervals.

A complementary description will be given to the problem that the rise time of the output signal from the inverter is not necessarily equal to the fall time thereof, which becomes more conspicuous with the lowering of the power source voltage (e.g., from 5 V to 3 V).

When the power source voltage is lowered, the number of transistors that can be interposed between a power source and the ground is reduced. Specifically, the number of transistors that can be interposed is reduced from 4 to 3 when the power source voltage is lowered from 5 V to 3 V. The lowering of the power source voltage to 3 V causes the reduction in the number of transistors that can be interposed, which presents the following problem.

To impart the signal inverting function to an inverter, at least two transistors should be interposed and an additional transistor should further be interposed to adjust the speed at which a signal propagates. However, the provision of only one additional transistor permits the adjustment of either the speed at which the output signal rises or the speed at which the output signal falls. To adjust both the rise speed and fall speed of the output signal, two additional transistors should be connected in series. To adjust the signal propagation speed in the inverter ring, therefore, the total of four transistors should be provided in each of the inverters, of which two are for performing the signal inverting function and the other two are for adjusting both the rise speed and fall speed of the output signal.

However, since only three transistors can be connected in series when the power source voltage is 3 V, as described above, it follows that only one transistor can be provided to adjust the signal propagation speed. This is because the two inverters for performing the signal inverting function are essential to the inverter. If it is assumed that one transistor for adjusting the signal propagation speed is dedicated to adjusting the rise speed of the output signal, the output signal can rise stably owing to the transistor. However, the output signal cannot fall stably since the fall speed thereof is determined by the two transistors for performing the signal inverting function. This is because one transistor for adjusting the signal propagation speed is in a constant-current region, while the two transistors for performing the signal inverting function is in a variable-resistance region. Thus, only the rise speed or fall speed of the output signal can be adjusted in the inverter when the power source voltage is 3 V, with the result that signal propagation time on the rising edge of the output signal differs greatly from signal propagation time on the falling edge thereof.

The adverse effect exerted by the problem on the accuracy with which time is measured by the time counting circuit is aggravated by reduced delay times in the inverters, i.e., by reduced increments of time in the time counting circuit. This is apparent from, e.g., the result of the simulation shown in FIG. 5 in which the falling edge of the output signal from the 2nd differential inverter is lagging behind the rising edge of the output signal from the 3rd differential inverter (the falling edge of the output signal from the 2nd differential inverter should intrinsically lead the rising edge of the output signal from the 3rd differential inverter). Thus, the order in which signal transition propagates in the inverter ring may be reversed due to the great difference between signal propagation time on the rising edge of the output signal and signal propagation time on the falling edge thereof.

A description will be given next to the reason for equal time interval between the edges of a signal in a signal group composed of a plurality of pulse signals obtained by fetching alternately the normal output signals and inverted output signals from the individual differential inverters composing the differential inverter ring.

In one of the differential inverters composing the differential inverter ring, the inverted output signal falls on the rising edge of the normal output signal and the normal output signal falls on the rising edge of the inverted output signal. Hence, it can be considered that the rising and falling edges of signal combine to form signal transition which circulates around the differential inverter ring.

If the frequency of oscillation in the differential inverter ring is constant and the individual differential inverters are of identical structure, a propagation delay time of signal transition or the combination of the rising and falling edges of signal circulating around the differential inverter ring becomes equal in each of the differential inverters. Moreover, since the time required for the rising edge of the output signal from each of the differential inverters is equal because of the identical structure of the differential inverters, the rising edge of signal circulating around the differential inverter ring exhibits, in each of the differential inverters, an equal propagation delay time that has been obtained in consideration of the rise time of the output signal from the differential inverter. Likewise, since the time required for the falling edge of the output signal from each of the differential inverters is equal, the falling edge of signal circulating around the differential inverter ring exhibits, in each of the differential inverters, an equal propagation delay time that has been obtained in consideration of the fall time of the output signal from the differential inverter.

Thus, by fetching alternately the normal and inverted signals in the differential inverter ring, there can be obtained a signal group composed of a plurality of pulse signals having edges at equal time intervals.

Next, signal processing performed in a time counting circuit using the circuit shown in FIG. 1 will be described.

Figure 7:
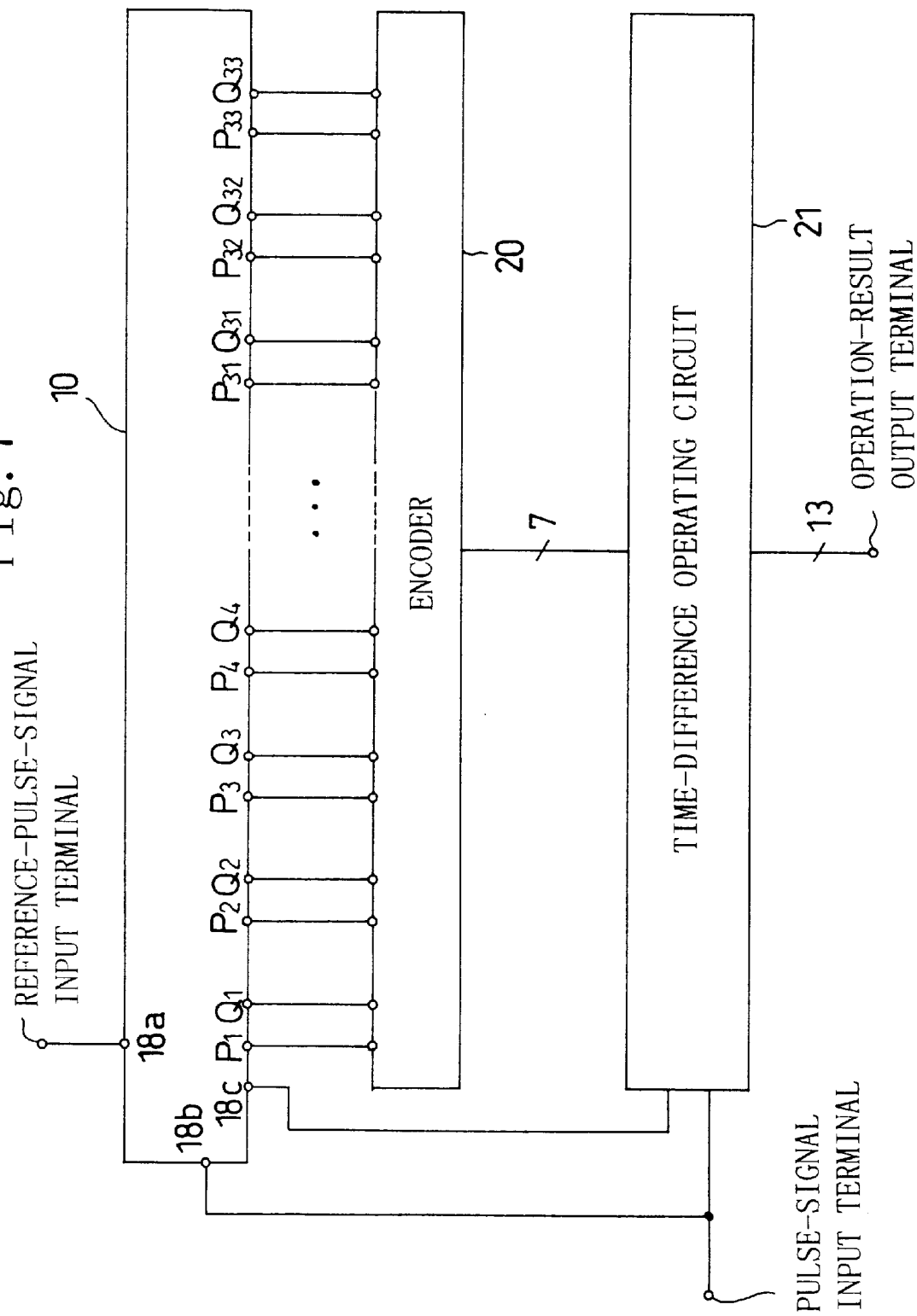
FIG. 7 shows the structure of the time counting circuit according to the first embodiment of the present invention.

FIG. 7 illustrates the structure of a time counting circuit using the circuit shown in FIG. 1, in which are shown: the principal circuit 10 shown in FIG. 10; an encoder 20 as signal converting means for converting output data from the principal circuit 10; and a time-difference operating circuit 21 for obtaining a pulse spacing based on the numeric data outputted from the encoder 20. The first row of holding circuits 12, the second row of holding circuits 13, and the encoder 20 constitute counting means. The time counting circuit shown in FIG. 7 is characterized in that the encoder 20 fetches both the output signals $P_1$ to $P_{33}$ from the first row of holding circuits 12 and the output signals $Q_1$ to $Q_{33}$ from the second row of holding circuits 13.

Figure 8:
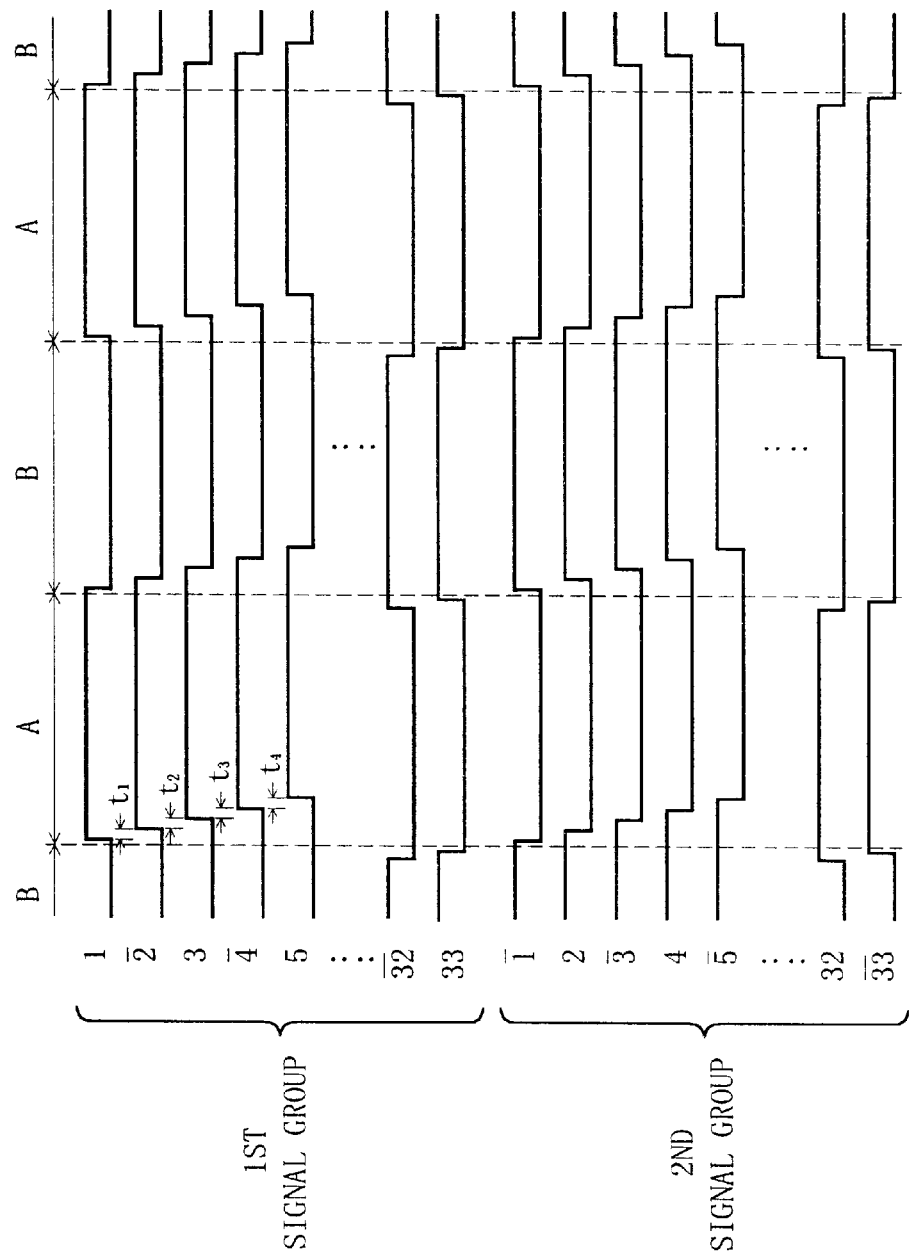
FIG. 8 shows the transitions of the output signals from the individual differential inverters in the differential inverter ring 11 shown in FIG. 1, which is for illustrating first and second signal groups and the selection of the first or second signal group.

FIG. 8 shows the transitions of the output signals from the individual differential inverters composing the differential inverter ring 11 in the principal circuit 10. In the drawing, the unbarred numeric characters indicate the normal output signals and the barred numeric characters indicate the inverted output signals.

As shown in FIG. 8, the rising edge of the normal output signal from the 1st differential inverter is followed by the rising edge of the inverted output signal from the 2nd differential inverter after the delay time in the differential inverter. Subsequently, the normal output signal from the 3rd differential inverter, the inverted output signal from the 4th differential inverter, and the normal output signal from the 5th differential inverter rise in this order. The foregoing process proceeds till the rising edge of the normal output signal from the 33rd differential inverter, which is followed by the rising edge of the inverted output signal from the 1st differential inverter after the delay time in the differential inverter. Subsequently, the normal output signal from the 2nd differential inverter, the inverted output signal from the 3rd differential inverter, and the normal output signal from the 4th differential inverter rise in this order.

On the other hand, the falling edge of the normal output signal from the 1st differential inverter is followed by the falling edge of the inverted output signal from the 2nd differential inverter after the delay time in the differential inverter. Subsequently, the normal output signal from the 3rd differential inverter, the inverted output signal from the 4th differential inverter, and the normal output signal from the 5th differential inverter fall in this order. The process proceeds till the falling edge of the normal output signal from the 33rd differential inverter, which is followed by the falling edge of the inverted output signal from the 1st differential inverter after the delay time in the differential inverter. Subsequently, the normal output signal from the 2nd differential inverter, the inverted output signal from the 3rd differential inverter, and the normal output signal from the 4th differential inverter fall in th is order. In this manner, the rising and falling edges of signal circulate around the differential inverter ring.

As described above, the time intervals (t1, t2, t3, and t4 in FIG. 8) between the edges of the individual output signals become equal.

It is assumed here that normal output signals from the odd-numbered differential inverters and inverted output signals from the even-numbered differential inverters form a first signal group and that inverted output signals from the odd-numbered differential inverters and normal output signals from the even-numbered differential inverters form a second signal group. In the time region A shown in FIG. 8, the individual signals included in the first signal group sequentially rise, while the individual signals included in the second signal group sequentially fall. In the time region B, the individual signals included in the first signal group fall, while the individual signals included in the second signal group rise.

Therefore, a signal group composed of signals which sequentially rise at equal time intervals can be obtained by selecting the first signal group in the time region A and by selecting the second signal group in the time region B. The use of such a signal group enables time measurement with high accuracy. Likewise, a signal group composed of signals which sequentially fall at equal time intervals can be obtained by selecting the second signal group in the time region A and by selecting the first signal group in the time region B, which also enables time measurement with high accuracy.

In the case where time to be measured is sufficiently short compared with the time regions A and B, either one of the first and second signal groups may be used.

Although the present embodiment selects the first or second signal group at the stage of digital signal processing, as will be described later, the present invention is not limited thereto.

Figure 9:
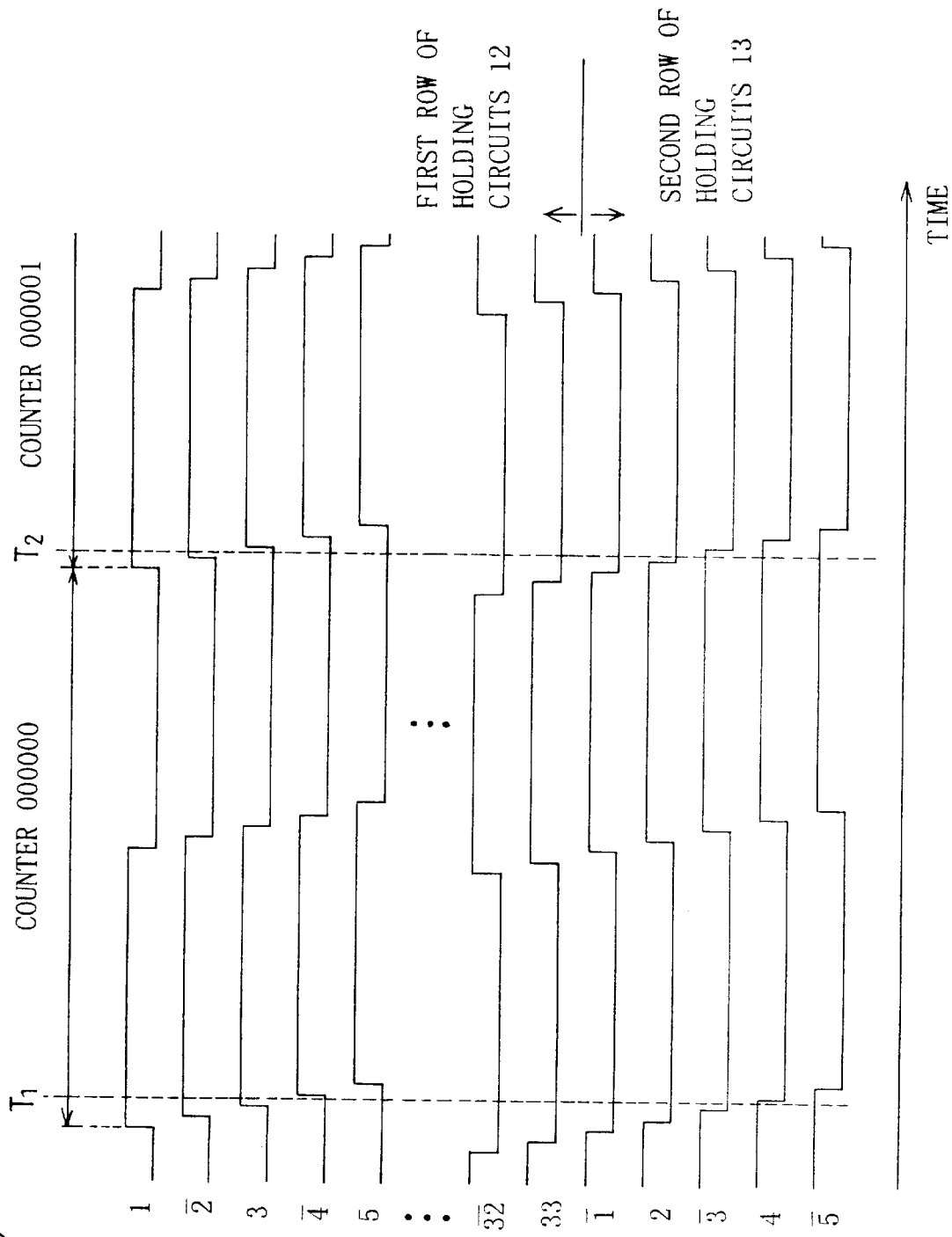
FIG. 9 shows the transitions of the output signals from the differential inverters, which is for illustrating signal processing in the time counting circuit according to the first embodiment of the present invention.

The signal processing performed in the time counting circuit according to the present embodiment will be described with reference to FIG. 9. It is assumed that a pulse signal to be measured rises at the time $T_1$ in FIG. 9. At that time, the first row of holding circuits 12 hold and output the normal output signals from the odd-numbered differential inverters and the inverted output signals from the even-numbered differential inverters, so that the signals "111000 . . . 00" are outputted therefrom. On the other hand, the second row of holding circuits 13 hold and output the inverted output signals from the odd-numbered differential inverters and the normal output signals from the even-numbered differential inverters, so that the signals "000111 . . . 11" are outputted therefrom.

If it is assumed that the pulse signal to be measured rises next at the time $T_2$, the first row of holding circuits 12 output the signals "110000 . . . 00", while the second row of holding circuits 13 output the signals "001111 . . . 11".

FIG. 10 shows the relationship between the output signals from the first and second rows of holding circuits 12 and 13 and time.

In the drawing, an increment of time corresponds to the delay time in one differential inverter so that, when the delay time is 1 ns, the increment of time is also 1 ns. Since the first row of holding circuits 12 hold and output the normal output signals from the odd-numbered differential inverters and the inverted output signals from the even-numbered differential inverters, the output signals therefrom include a sequence of "0s" and a sequence of "1s". Since the second row of holding circuits 13 hold and output the inverted output signals from the odd-numbered differential inverters and the normal output signals from the even-numbered differential inverters, the output signals therefrom also include a sequence of "0s" and a sequence of "1s".

In the outputs signals from the first and second rows of holding circuits 12 and 13, the position at which "0" is followed by "1" or "1" is followed by "0" corresponds to the current position of signal transition. However, since the rise time of the output signal is different from the fall time thereof, as described above, it is assumed here that only the position at which "1" is followed by "0" corresponds to the current position of signal transition with a view to providing equal increments of time. For example, the current position of signal transition at TIME 4 is the inverting output terminal of the 4th differential inverter (expressed as "/4" in FIG. 10) and the current position of signal transition at TIME 35 is the normal output terminal of the 2nd differential inverter (expressed as "2" in FIG. 10). In this manner, there can be obtained time data representing 66 tones which correspond to two circulations of signal transition.

The encoder 20 outputs 7-bit data representing 66 tones from "0,000000" to "1,000001" based on the output signals from the first and second rows of holding circuits 12 and 13.

The counter 14a counts the falling edges of the normal output signal from the 33rd differential inverter.

The time-difference operating circuit 21 obtains 13-bit time data composed of upper-bit data outputted from the circulation-number-data output terminal 18c (count data from the counter 14a) and lower-bit data outputted from the encoder 20. FIG. 11 shows the relationship between the time data obtained by the time-difference operating circuit 21 and time.

Although the lower-bit data is 7-bit data, it represents only 66 tones, so that the time data lacks continuity if the lower-bit data is simply combined with the upper-bit data. To prevent this, data correction will be performed as follows.

When the lower-bit data is represented by A and the upper-bit data is represented by B, A+2B is obtained first. Then, the data "B,000000" obtained by carrying the data B by six bits is added to A+2B. At TIME 2143 in FIG. 11, for example, the lower-bit data or data A is "0,011110" and the upper-bit data or data B is "100000" so that A+2B becomes "1,011110". When the data "100000,000000" obtained by carrying the data B by six bits is added to A+2B, time data "0,100001,011110" is obtained. Through such data correction, there can be obtained continuous time data representing 4224 (=66×2⁶) tones from "0,000000,000000" to "1,000001,111111".

Figure 12:
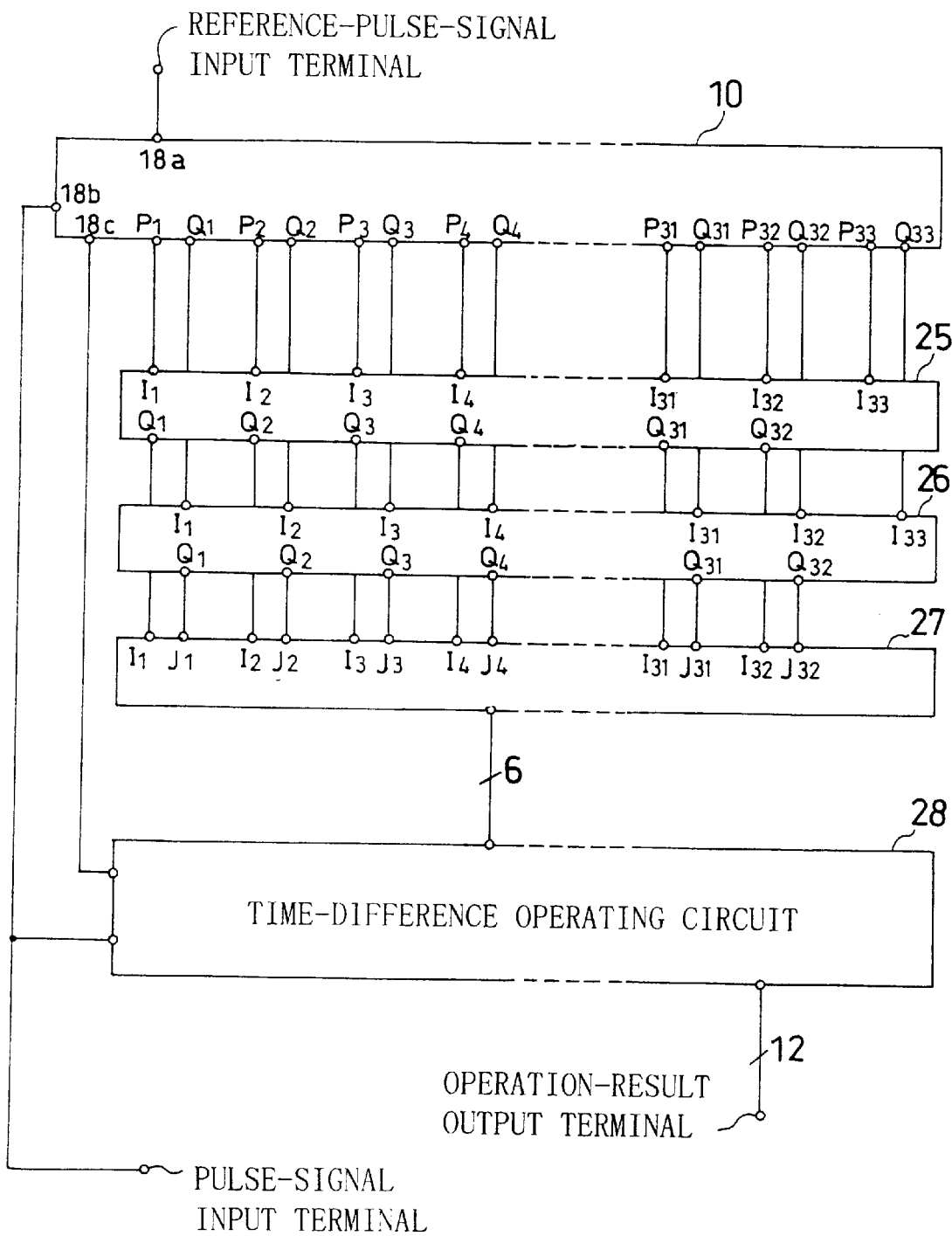
FIG. 12 shows the structure of another time counting circuit according to the first embodiment of the present invention.

FIG. 12 illustrates the structure of another time counting circuit using the circuit shown in FIG. 1. In FIG. 12 are shown: the principal circuit 10 shown in FIG. 1; a first pre-encoder 25 for converting the output signals $P_1$ to $P_{33}$ from the first row of holding circuits 12 to bit data and outputting the obtained bit data; a second pre-encoder 26 for converting the output signals $Q_1$ to $Q_{33}$ from the second row of holding circuits 13 to bit data and outputting the obtained bit data; an encoder 27 for converting the bit data outputted from the first pre-encoder 25 and the bit data outputted from the second pre-encoder 26 to numeric data and outputting the obtained numeric data; and a time-difference operating circuit 28 for obtaining the time interval of a pulse signal based on the numeric data outputted from the encoder 27. The first and second pre-encoders 25 and 26 and the encoder 27 constitute signal converting means. The signal converting means and the first and second rows of holding circuits 12 and 13 constitute counting means.

The first pre-encoder 25 performs a logic operation with respect to the output signals from every two adjacent holding circuits in the first row of holding circuits 12 and outputs 32-bit data. In accordance with the logic operation, "1" is given only when the output signal from a certain holding circuit is "1" and the output signal from the subsequent holding circuit is "0", while "0" is provided in the other cases. At TIME 3 in FIG. 10, for example, each of the normal output signal from the 1st differential inverter and the inverted output signal from the 2nd differential inverter is "1" and each of the subsequent output signals headed by the normal output signal from the 3rd differential inverter and ended by the normal output signal from the 33rd differential inverter is "0", so that the first pre-encoder 25 outputs data in which only the 2nd bit is "1" and all the other bits are "0s".

The second pre-encoder 26 performs a logic operation, similar to the logic operation performed by the first pre-encoder 25, with respect to the output signals from every two adjacent holding circuits in the second row of holding circuits 13 and outputs 32-bit data.

The encoder 27 carries out the logical OR between each of the bits in the output data from the first pre-encoder 25 and the corresponding bit in the output data from the second pre-encoder 26, converts obtained bit data to 6-bit data representing 33 tones, and outputs the obtained 6-bit data.

FIG. 13 shows output data from the first pre-encoder 25, output data from the second pre-encoder 26, and the output data from the encoder 27 at different times.

The time-difference operating circuit 28 obtains 12-bit time data composed of upper-bit data outputted from circulation-number-data output terminal 18c (count data from the counter 14a) and lower-bit data outputted from the encoder 27. FIG. 14 shows the relationship between the time data obtained by the time-difference operating circuit 28 and time. It is assumed here that the counter 14a counts both the rising edges of the normal output signal from the 33rd differential inverter and the falling edges thereof. As shown in FIG. 14, correction is performed to impart continuity to the time data.

Thus, in the time counting circuit according to the present embodiment, the position of signal transition at a certain time can constantly be detected based only on the rising (or falling) edge of signal by using a differential inverter ring composed of an odd number of differential inverters connected in a ring configuration and by fetching alternately the normal output signals and inverted output signals from the individual differential inverters. As a result, equal increments of time are provided and the accuracy of time data is improved.

It is to be noted that an output signal from the differential inverter ring need not necessarily be held as the logic level "1" or "0" but may be held as an analog voltage by a sampling circuit.

The present embodiment has achieved the effect of reducing the time interval between the edges of the obtained group of signals, i.e., increments of time in the time counting circuit by using differential inverters, compared with the case of using non-differential inverters as in a second embodiment, which will be described later.

(Second Embodiment)

The first embodiment has used the differential inverter ring to detect the current position of signal transition based only on the rising or falling edges of signals. The present embodiment achieves the same effect without using the differential inverters.

Figure 15:
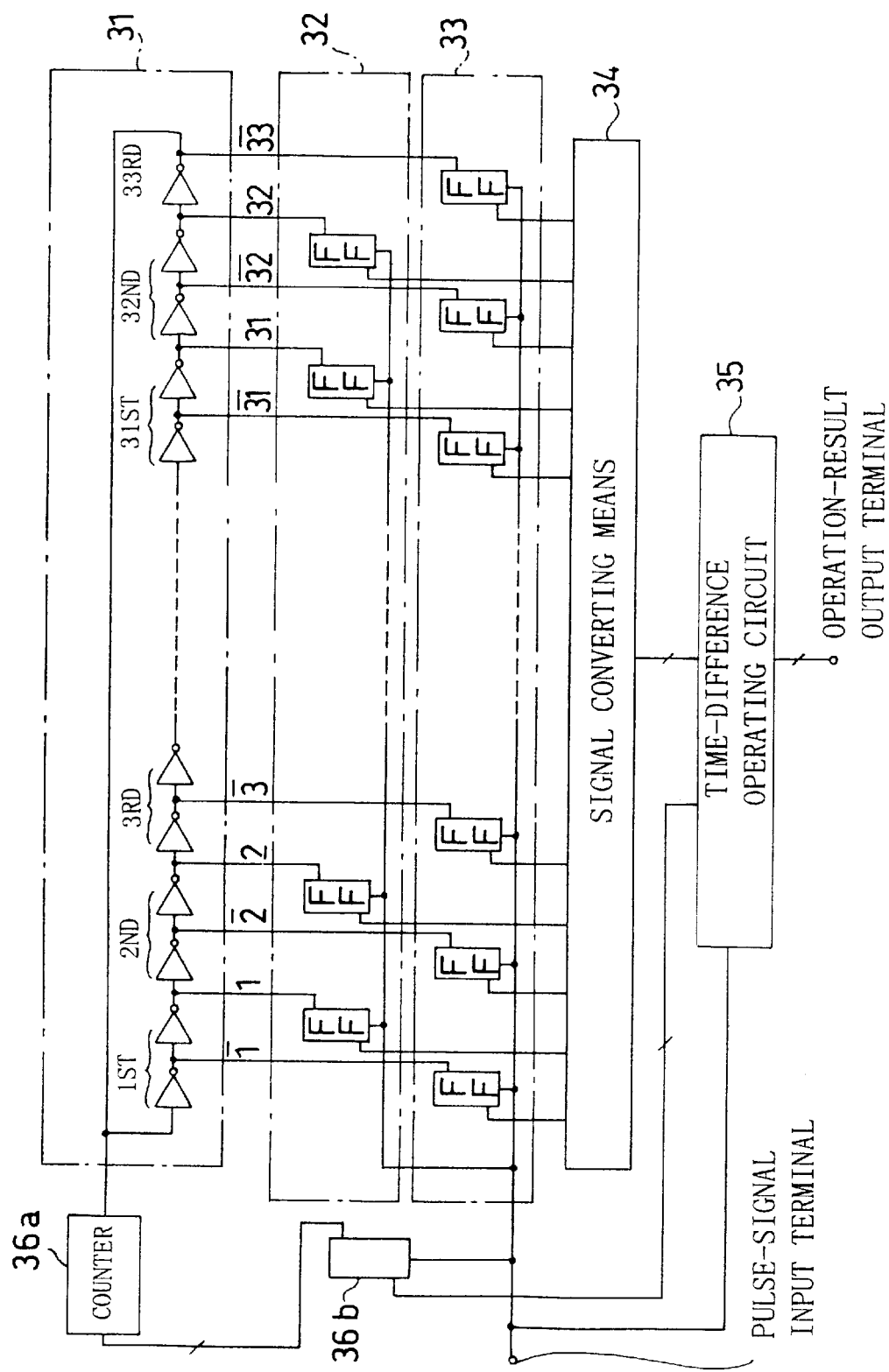
FIG. 15 shows the structure of a time counting circuit according to a second embodiment of the present invention.
Figure 18:
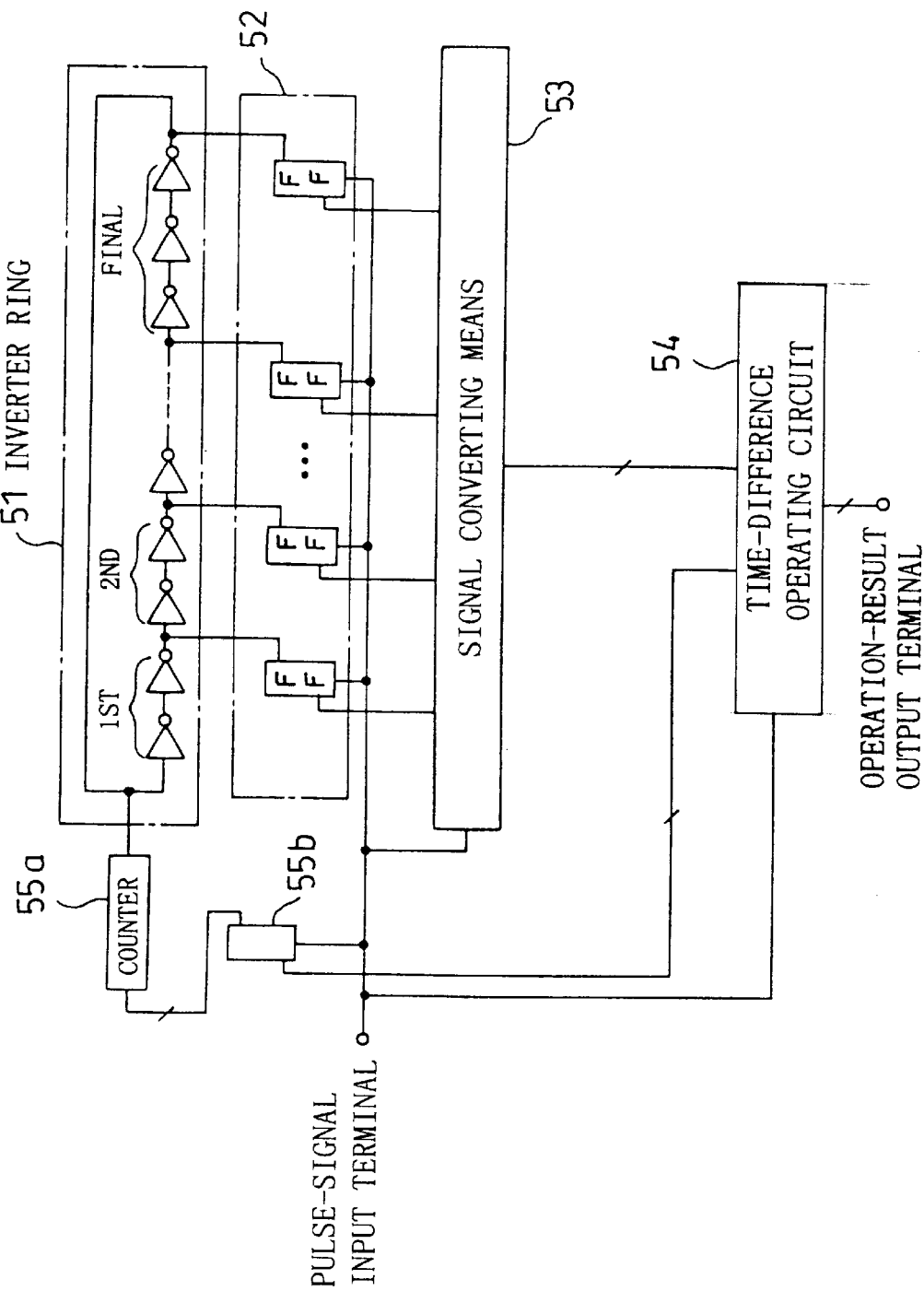
FIG. 18 is a circuit diagram showing the structure of a conventional time counting circuit.
Figure 19A:
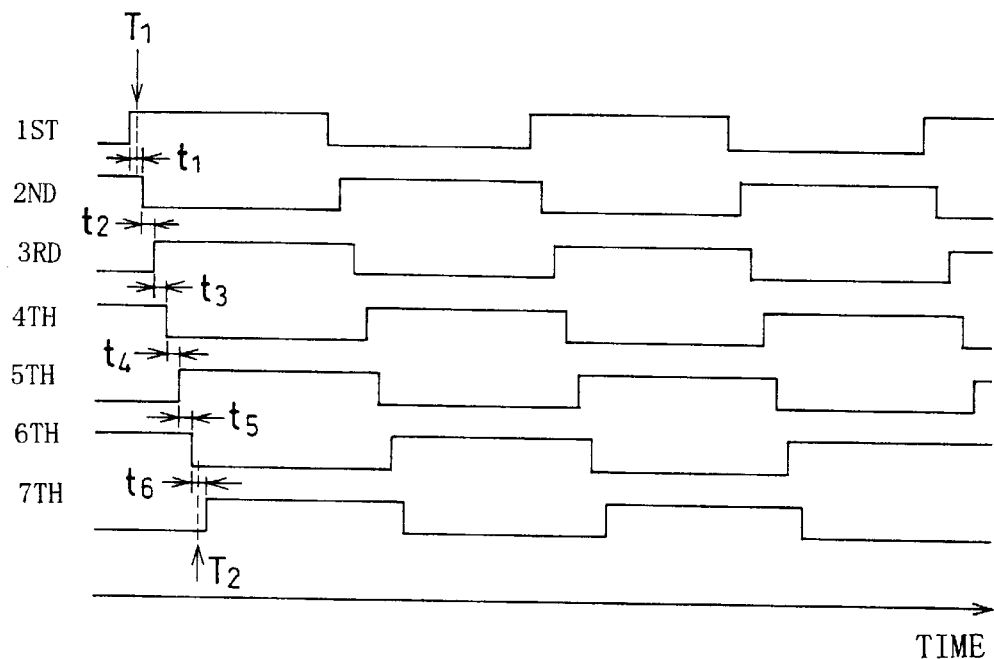
FIG. 19(*a*) is a graph showing transitions of respective output signals from an odd number of identical inverters composing an inverter ring and FIG. 19(*b*) is a graph showing different delay times in the individual inverters when the rise times of the output signals from the inverters are different from the fall times thereof.
Figure 19B:
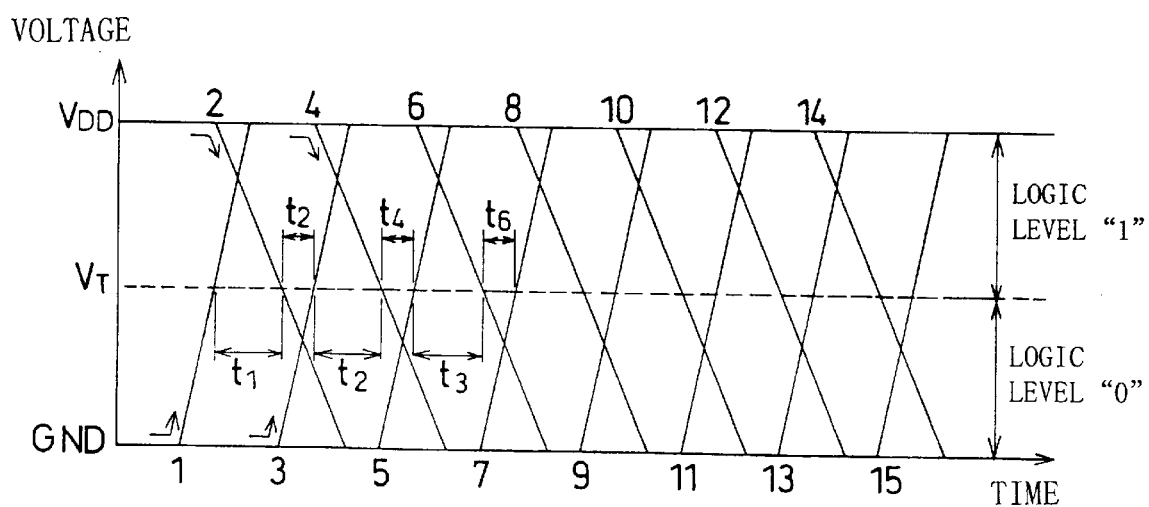

FIG. 15 illustrates the structure of a time counting circuit according to a second embodiment of the present invention, in which are shown: an inverter ring 31 as the delay circuit ring; a first row of holding circuits 32; a second row of holding circuits 33; signal converting means 34; a time-difference operating circuit 35; a counter 36a; and a counter-output holding circuit 36b. A pulse signal to be measured is inputted to a pulse-signal input terminal and data representing the pulse spacing of the pulse signal to be measured is outputted from an operation-result output terminal.

The inverter ring 31 is composed of thirty-three delay circuits connected in a ring configuration. Each of the 1st to 32nd delay circuits is composed of two inverters. The final (33rd) delay circuit is composed of a single inverter. In short, the inverter ring 31 is composed of 65 (=2×32+1) inverters. Since the inverter ring 31 is composed of the odd number of inverters connected in a ring configuration, oscillation occurs in the inverter ring 31 and signal transition circulates around the inverter ring 31. It is assumed here that all the inverters composing the inverter ring 31 are of identical structure and that the delay times in the individual inverters are equal.

Each of the holding circuits 32 in the first row is connected to the lower-stage inverter composing each of the 1st to 32nd delay circuits. In other words, the individual holding circuits are connected to the output terminals of the even-numbered inverters composing the inverter ring 31.

Each of the holding circuits 33 in the second row is connected to the upper-stage inverter composing each of the 1st to 32nd delay circuits. In other words, the individual holding circuits are connected to the output terminals of the odd-numbered inverters composing the inverter ring 31.

On the rising edge of the pulse signal to be measured which has been inputted to the pulse-signal input terminal, each of the holding circuits 32 and 33 in the first and second rows holds a signal at the output terminal of the inverter to which it is connected.

The signal converting means 34 converts output signals from the first and second rows of holding circuits 32 and 33 to numeric data.

The counter 36a is connected to the output terminal of the final inverter and counts changes in a signal at the output terminal as the number of circulations of signal transition around the inverter ring 31. The counter-output holding circuit 36b holds and outputs the count data from the counter 36a on the rising edge of the pulse signal to be measured which has been inputted to the pulse-signal input terminal.

The time-difference operating circuit 35 obtains time data composed of lower-bit data which is the numeric data outputted from the signal converting means 34 and upper-bit data which is the count data outputted from the counter-output holding circuit 36b, obtains the pulse spacing of the pulse signal to be measured which has been inputted to the pulse-signal input terminal, and outputs the result of operation from the operation-result output terminal.

A description will now be given to the movement of signals in the inverter ring 31.

It is assumed first that an input signal to the 1st delay circuit rises. Then, an output signal from the 1st delay circuit (i.e., an input signal to the 2nd delay circuit) rises after the delay times in the two inverters). Likewise, when an input signal to the delay circuit other than the 33rd delay circuit rises, an output signal therefrom rises after the delay times in the two inverters, the rising edge of signal propagates from the 1st to 32nd delay circuits. When an input signal to the 33rd delay circuit rises, an output signal therefrom (i.e., an input signal to the 1st delay circuit) falls after the delay time in one inverter.

When the input signal to the 1st delay circuit falls, the output signal from the 1st delay circuit falls after the delay times in the two inverters. Likewise, when the input signal to the delay circuit other than the 33rd delay circuit falls, the output signal therefrom falls after the delay times in the two inverters, so that the falling edge of signal propagates from the 1st to 32nd delay circuits. When the input signal to the 33rd delay circuit falls, the output signal therefrom (i.e., the input signal to the 1st delay circuit) rises after the delay time in one inverter. Thus, the signals repeatedly show the movement in which the rising edge and falling edge of signal alternately propagate.

When the input signal to the delay circuit other than the 33rd delay circuit falls, the output signal from the upper-stage inverter composing the delay circuit rises. If attention is given to the output signal from the upper-stage inverter composing each of the 1st to 32nd delay circuits, it follows that the rising edge of signal propagates. By utilizing the fact, the position of signal transition is detected constantly based on the rising edge of signal, which characterizes the present embodiment. Moreover, since the delay times in two inverters exist between the transition of the input signal to the 33rd delay circuit and the transition of the output signal from the upper-stage inverter composing the 1st delay circuit, increments of time are constantly equal.

If the inverter ring 31 is considered to be an inverter ring composed of 65 inverters, the first row of holding circuits 32 receives output signals (first signal group) from the even-numbered inverters of the inverter ring 31 and the second row of holding circuits 33 receives output signals (second signal group) from the odd-numbered inverters of the inverter ring 31.

FIG. 16 shows the relationship between the output signals from the first and second rows of holding circuits 32 and 33 and time. In the drawing, an increment of time corresponds to the delay time in two inverters. If the delay time in one inverter is 1 ns, an increment of time is 2 ns. Since each of the holding circuits 32 in the first row is connected to the output terminal of every other inverter, the output signals therefrom include a sequence of "0s" and a sequence of "1s". Since each of the holding circuits 33 in the second row is also connected to the output terminal of every other inverter, the output signals therefrom also include a sequence of "0s" and a sequence of "1s".

If the output signals from the first and second rows of holding circuits 32 and 33 are regarded as a series of signals, it will be understood that the position at which "1" is followed by "0" advances in the series of signals with the passage of time. The position corresponds to the current position of the rising edge of signal which is propagating. If the position is assumed to be the position of signal transition, signal transition is occurring at the output terminal of the lower-stage inverter composing the 4th delay circuit at TIME 4 (expressed as "4" in FIG. 16), while signal transition is occurring at the output terminal of the upper-stage inverter composing the 3rd delay circuit at TIME 35 (expressed as "/3" in FIG. 16).

By recognizing the position of signal transition, time data representing 65 tones in an increment of time which is double the delay time in one inverter can be obtained in two circulations of signal transition around the inverter ring 31.

The signal converting means 34 detects the position of signal transition from the output signals from the first and second rows of holding circuits 32 and 33 and outputs 7-bit numeric data representing 65 tones from "0,000000" to "1,000000".

The counter 36a counts the rising edges of the output signal from the 33rd delay circuit.

The time-difference operating circuit 35 obtains 13-bit time data composed of upper-bit data which is the count data from the counter 36a and lower-bit data which is the output data from the signal converting means 34. FIG. 17 shows the relationship between the time data obtained by the time-difference operating circuit 35 and time.

Although the lower-bit data is 7-bit data, it represents only 65 tones, so that the time data lacks continuity if the lower-bit data is simply combined with the upper-bit data. To prevent this, data correction will be performed as follows.

When the lower-bit data is represented by A and the upper-bit data is represented by B, A+B is obtained first. Then, the data "B,000000" obtained by carrying the data B by six bits is added to A+B. At TIME 2111 in FIG. 17, for example, the lower-bit data or data A is "0,011111" and the upper-bit data or data B is "100000" so that A+B becomes "0,111111". When the data "100000,000000" obtained by carrying the data B by six bits is added to A+B, time data "0,100000,111111" is obtained. Through such data correction, there can be obtained continuous time data with 4160 (=65×2$^6$) tones from "0,000000,000000" to "1,000000,111111".

Thus, with the time counting circuit according to the present embodiment, the position of signal transition at a certain time can constantly be detected based only on the rising (or falling) edge of signal by using an inverter ring composed of an odd number of inverters connected in a ring configuration and by fetching output signals from every two inverters. As a result, equal increments of time are provided and the accuracy of time data is improved.

Although the first embodiment has described the method of generating a plurality of pulse signals having edges at extremely short, equal time intervals by fetching alternately the normal output signals and inverted output signals from the individual differential inverters composing the differential inverter ring around which signal transition circulates and the second embodiment has described the method of generating a plurality of pulse signals having edges at extremely short, equal time intervals by fetching output signals from every two inverters composing the inverter ring around which signal transition circulates, application of the methods is not limited to the time counting circuits. The methods may be considered as a separate and distinct invention independent of the time counting circuit when viewed from a different perspective.

The pulse-signal generating methods are extremely important to future communication technology and signal processing technology so that they may find wide application in various fields. The application of the pulse-signal generating methods will be descried complementarily.

In the field of data communications, the speed of data transmission, particularly between LSIs, has been increased through the years. However, the current speed of data transmission is considered to be insufficient for an enhanced image processing function. To provide. technology for implementing higher-speed data transmission, there can be proposed a pulse generating circuit capable of outputting a plurality of pulse signals having edges at extremely short, equal time intervals.

For example, although the technology of pulse width modulation measures the time between the rising and falling edges of a pulse to obtain information from the pulse width, a group of signals generated by the above pulse-signal generating methods can be used for the measurement. As the time intervals between the edges of the pulse signals included in the signal group are reduced, the amount of information to be transmitted is increased accordingly. In the case of holding data transmitted at a high speed, the group of signals generated by the above pulse-signal generating methods can be used as a signal indicating data holding. As the time intervals between the edges of the pulse signals included in the signal group are reduced, the speed of data transmission is increased accordingly.

The time intervals between the edges of the pulse signals are insufficient if they are merely short. They should be short and equal with no variation. If the time intervals between the edges vary, false recognition of information may occur in the technology of pulse width modulation and false holding of data may occur in high-speed data transmission. For implementing high-speed data transmission, therefore, the pulse-signal generating methods whereby a plurality of pulse signals having edges at extremely short, equal time intervals can be generated are indispensable.

To reduce the time interval between the edges to a short time period of 1 ns or less, the use of a pulse-signal generating method using an inverter ring is being examined in which not arbitrary terminals between the inverters of the inverter ring but all terminals are used as output-signal terminals. In accordance with the pulse-signal generating method, the time interval between the edges of pulse signals corresponds to a delay time in one inverter, so that it becomes possible to reduce the time interval between the edges to a short time period of 1 ns or less.

From the foregoing background, it may be considered that the pulse-signal generating methods according to the present invention in which the inverter ring is used to generate a plurality of pulse signals having edges at extremely short, equal time intervals will play an important role in future communication technology and signal processing technology.

It is to be noted that, in the pulse-signal generating methods according to the present invention, the inverters need not necessarily be connected in a ring configuration. The methods can be implemented similarly by using a row of inverters connected in series along which signal transition propagates.

We claim:

1. A time counting circuit comprising:
    a delay circuit ring comprising a plurality of delay circuits around which a signal transition is caused to circulate by oscillation, said delay circuit capable of outputting a group of signals sequentially rising or falling at equal time intervals; and
    counting means for detecting, from said group of signals, the position of said signal transition in said delay circuit ring at a certain time.

2. A time counting circuit comprising:
    a differential inverter ring composed of an odd number of differential inverters connected in a ring configuration around which a signal transition is caused to circulate by oscillation, each of the differential inverters having a normal output terminal and an inverting output terminal connected to the respective inverting input terminal and normal input terminal of a subsequent differential inverter; and
    counting means for receiving at least one of a first signal group composed of normal output signals from odd-numbered differential inverters in said differential inverter ring and inverted output signals from even-numbered differential inverters in said differential inverter ring and a second signal group composed of inverted output signals from the odd-numbered differential inverters in said differential inverter ring and normal output signals from the even-numbered differential inverters in said differential inverter ring and obtaining, based on at least one of the first and second signal groups, the position of the signal transition in said differential inverter ring at a certain time.

3. A time counting circuit according to claim 2, wherein said counting means receives said first and second signal groups, selects one of said first and second signal groups in which the individual signals rise sequentially, and obtains, based on the selected signal group, the position of the signal transition in said differential inverter ring at a certain time.

4. A time counting circuit according to claim 2, wherein said counting means receives said first and second signal groups, selects one of said first and second signal groups in which the individual signals fall sequentially, and obtains, based on the selected signal group, the position of the signal transition in said differential inverter ring at a certain time.

5. A time counting circuit according to claim 2, wherein said counting means comprises:
a first row of holding circuits comprising a plurality of holding circuits connected to the respective normal output terminals of the odd-numbered differential inverters in said differential inverter ring and to the respective inverting output terminals of the even-numbered differential inverters in said differential inverter ring, said first row of holding circuits holding the output signals from the differential inverters to which the individual holding circuits are connected on an edge of a pulse signal to be measured and outputting the plurality of held output signals as a first row of signals;
a second row of holding circuits comprising a plurality of holding circuits connected to the respective inverting output terminals of the odd-numbered differential inverters in said differential inverter ring and to the respective normal output terminals of the even-numbered differential inverters in said differential inverter ring, said second row of holding circuits holding the output signals from the differential inverters to which the individual holding circuits are connected on the edge of the pulse signal to be measured and outputting the plurality of held output signals as a second row of signals; and
signal converting means for converting the first row of signals outputted from said first row of holding circuits and the second row of signals outputted from said second row of holding circuits to numeric data representing the position of the signal transition in said differential inverter ring and outputting the numeric data,
said time counting circuit determining the time period between the edges of said pulse signal to be measured based on the numeric data outputted from said signal converting means.

6. A time counting circuit according to claim 5, wherein said signal converting means detects a position at which a signal of one logic level is followed by a signal of the other logic level in said first and second rows of signals as the position of the signal transition in said differential inverter ring, obtains numeric data representing the detected position, and outputs the numeric data.

7. A time counting circuit according to claim 5, wherein said signal converting means comprises:

a first pre-encoder for receiving the first row of signals outputted from said first row of holding circuits, generating first data representing a position at which the signal on one logic level is followed by the signal on the other logic level in the first row of signals, and outputting the first data;
a second pre-encoder for receiving the second row of signals outputted from said second row of holding circuits, generating second data representing a position at which the signal on one logic level is followed by the signal on the other logic level in the second row of signals, and outputting the second data; and
an encoder for receiving the first data outputted from said first pre-encoder and the second data outputted from said second pre-encoder, converting said first data and said second data to numeric data representing the position of signal transition in said differential inverter ring, and outputting the numeric data.

8. A time counting circuit according to claim 5, wherein each of the holding circuits comprising the first and second rows of holding circuits is a sampling circuit for holding, as an analog signal, the output signal from the differential inverter coupled thereto.

9. A method of generating a plurality of pulse signals comprising the steps of:
providing a row of inverters composed of inverters connected in series along which signal transition propagates; and
fetching output signals from every two inverters composing said row of inverters such that the fetched signals are used as the plurality of pulse signals when the rise and fall times of the output signal from the inverter composing said row of inverters have such a difference therebetween as to substantially adversely affect design specifications on the intervals between the edges of said plurality of pulse signals.

10. A time counting circuit comprising:
an inverter ring comprising an odd number of inverters connected in a ring configuration around which a signal transition is caused to circulate by oscillation; and
counting means for receiving a first signal group comprising output signals from even-numbered inverters in said inverter ring and a second signal group comprising output signals from odd-numbered inverters in said inverter ring and obtains, based on the received signal group the position of the signal transition in said inverter ring at a certain time;
wherein said counting means receives said first and second signal groups, selects one of the first and second signal groups in which the signals contained therein rise sequentially, and obtains, based on the selected signal group, the position of the signal transition in said inverter ring at a certain time.

11. A time counting circuit comprising:
an inverter ring comprising an odd number of inverters connected in a ring configuration around which a signal transition is caused to circulate by oscillation; and
counting means for receiving a first signal group comprising output signals from even-numbered inverters in said inverter ring and a second signal group comprising output signals from odd-numbered inverters in said inverter ring and obtains, based on the received signal group, the position of the signal transition in said inverter ring at a certain time;
wherein said counting means receives said first and second signal groups, selects one of the first and second signal groups in which the signals contained therein fall sequentially, and obtains, based on the selected signal group, the position of the signal transition in said inverter ring at a certain time.

12. A time counting circuit comprising:

an inverter ring comprising an odd number of inverters connected in a ring configuration around which a signal transition is caused to circulate by oscillation; and counting means for receiving a first signal group comprising output signals from even-numbered inverters in said inverter ring and a second signal group comprising output signals from odd-numbered inverters in said inverter ring and obtains, based on the received signal group, the position of the signal transition in said inverter ring at a certain time;

wherein said counting means comprises:

a first row of holding circuits comprising a plurality of holding circuits connected to output terminals of the even-numbered inverters in said inverter ring, said first row of holding circuits holding the output signals from the inverters to which the individual holding circuits are connected on an edge of a pulse signal to be measured and outputting the plurality of held output signals as a first row of signals;

a second row of holding circuits comprising a plurality of holding circuits connected to output terminals of the odd-numbered inverters in said inverter ring, said second row of holding circuits holding the output signals from the inverters to which the individual holding circuits are connected on the edge of the pulse signal to be measured and outputting the plurality of held output signals as a second row of signals; and signal converting means for converting the first row of signals outputted from said first row of holding circuits and the second row signals outputted from said second row of holding circuits to numeric data representing the position of the signal transition in said inverter ring and outputting the numeric data, said time counting circuit determining the time period between the edges of said pulse signal to be measured based on the numeric data outputted from said signal converting means.

13. A time counting circuit according to claim 12, wherein said signal converting means detects a position at which the signal of one logic level is followed by the signal of the other logic level in said first and second rows of the signals as the position of the signal transition in said inverter ring, obtains numeric data representing the detected position, and outputs the numeric data.

14. A method of generating a plurality of pulse signals comprising the steps of:

providing a row of differential inverters composed of a plurality of differential inverters connected in series along which signal transition propagates, each of the differential inverters having a normal output terminal and an inverting output terminal connected to the respective inverting input terminal and normal input terminal of the subsequent differential inverter; and fetching alternately normal output signals and inverted output signals from the differential inverters composing said row of differential inverters in the order in which the differential inverters are arranged such that the fetched signals are used as the plurality of pulse signals.

15. A method of generating a plurality of pulse signals comprising the steps of:

providing an inverter ring composed of an odd number of inverters connected in a ring configuration around which signal transition circulates; and fetching output signals from every two inverters composing said inverter ring such that the fetched signals are used as the plurality of pulse signals.

16. A method of generating a plurality of pulse signals comprising the steps of:

providing a differential inverter ring composed of an odd number of differential inverters connected in a ring configuration around which signal transition circulates, each of the differential inverters having a normal output terminal and an inverting output terminal connected to the respective inverted input terminal and normal input terminal of the subsequent differential inverter; and fetching alternately normal output signals and inverted output signals from the differential inverters composing said differential inverter ring in the order in which the differential inverters are arranged such that the fetched signals are used as the plurality of pulse signals.

17. A method of generating a plurality of pulse signals according to claim 16, wherein the fetching step comprises a step of fetching at least one of a first group of signals composed of the normal output signals from the odd-numbered differential inverters in said differential inverter ring and the inverted output signals from the even-numbered differential inverters in said differential inverter ring and a second group of signals composed of the inverted output signals from the odd-numbered differential inverters in said differential inverter ring and the normal output signals from the even-numbered differential inverters in said differential inverter ring such that the signals in the fetched group are used as the plurality of pulse signals.

* * * * *